United States Patent
Soga et al.

(10) Patent No.: US 6,653,430 B1
(45) Date of Patent: Nov. 25, 2003

(54) BUTADIENE POLYMERS AND PROCESS FOR PRODUCING CONJUGATED DIENE POLYMERS

(75) Inventors: Kazuo Soga, deceased, late of Ichihara (JP), by Hisae Soga, Akiko Nishida, Yoshiya Soga, legal representatives; Michihiko Asai, Tsukuba (JP); Yasuzo Suzuki, Tsukuba (JP); Akira Miyazawa, Tsukuba (JP); Kenji Tsuchihara, Tsukuba (JP); Masahide Murata, Tokyo (JP); Hiroyuki Ozaki, Tsukuba (JP); Masanao Kawabe, Tsukuba (JP); Yoshifumi Fukui, Tsukuba (JP); Jizhy Jin, Kanazawa (JP); Hideaki Hagihara, Tsukuba (JP); Toshio Kase, Tsukuba (JP)

(73) Assignees: Japan as Represented by Director General of the Agency of Industrial Science and Technology, Tokyo (JP); Japan Chemical Innovation Institute, Tokyo (JP)

( * ) Notice: Subject to any disclaimer, the term of this patent is extended or adjusted under 35 U.S.C. 154(b) by 0 days.

(21) Appl. No.: 09/601,469

(22) PCT Filed: Feb. 4, 1999

(86) PCT No.: PCT/JP99/00485

§ 371 (c)(1),
(2), (4) Date: Jun. 18, 2001

(87) PCT Pub. No.: WO99/40133

PCT Pub. Date: Aug. 12, 1999

(30) Foreign Application Priority Data

| Feb. 4, 1998 | (JP) | H10-38140 |
| Feb. 4, 1998 | (JP) | H10-38141 |
| Sep. 15, 1998 | (JP) | H10-280517 |
| Sep. 15, 1998 | (JP) | H10-280518 |
| Sep. 15, 1998 | (JP) | H10-280519 |
| Sep. 15, 1998 | (JP) | H10-280520 |

(51) Int. Cl.$^7$ .................................................. C08F 36/06
(52) U.S. Cl. ..................... 526/335; 526/152; 526/153; 526/160; 526/170; 526/340.4; 525/333.1; 525/333.2; 525/371
(58) Field of Search ................................. 526/160, 170, 526/335, 340.4, 152, 153; 525/333.1, 333.2, 371

(56) References Cited

U.S. PATENT DOCUMENTS

| 4,340,685 A | * | 7/1982 | Takeuchi et al. ........ 526/335 X |
| 4,579,920 A | * | 4/1986 | Tsujimoto et al. ... 526/340.4 X |
| 5,665,829 A | * | 9/1997 | Shepherd et al. ........ 525/332.3 |

FOREIGN PATENT DOCUMENTS

JP 08-113610 * 5/1996

* cited by examiner

*Primary Examiner*—Fred Teskin
(74) *Attorney, Agent, or Firm*—Armstrong, Westerman & Hattori, LLP

(57) ABSTRACT

A butadiene polymer (i) having a cis bond unit content of at least 50% based on the total butadiene units, a number average molecular weight (Mn) of 1,000 to 10,000,000, and at least 80%, based on the total molecular chains, of living chains containing a transition metal of group IV of the Periodic table at a terminal thereof; a polymer (ii) obtained by modifying terminals of the polymer (i); and a polymer (iii) obtained by coupling the polymers (i). These polymers (i), (ii) and (iii) are obtained by polymerizing a conjugated diene monomer alone or with a copolymerizable monomer at a specific temperature in the presence of a catalyst comprising a compound (A) of a transition metal of group IV of the periodic table having a cyclopentadienyl structure and a co-catalyst (B) selected from organoaluminum-oxy compound (a) and others and optionally further by contacting the resultant polymer with a terminal modifier or a coupling agent.

8 Claims, No Drawings

BUTADIENE POLYMERS AND PROCESS FOR PRODUCING CONJUGATED DIENE POLYMERS

TECHNICAL FIELD

This invention relates to a butadiene polymer having a high cis-bond unit content and a high living chain content, and a process for producing a conjugated diene polymer using a specific metallocene catalyst.

BACKGROUND ART

Metallocene catalsts generally have a high catalytic activity, and therefore, they exhibit a high efficiency for production of polymers and give polymers with well controlled stereoregularity. Further, an attempt of using a metallocene catalyst for the production of rubbers is being made.

Polymerization of butadiene using a cyclopentadienyltitanium trichloride/methylaluminoxane catalyst was proposed in Macromol. Chem. Rapid. Commun., 1990, vol. 11, p519; J. Organomet. Chem., 1993, vol. 451, p67; Macromol. Symp., 1995, vol. 89, p383; and Macromol. Rapid Commun., 1996, vol. 17, p781. This polymerization proceeds with a high activity to give a polymer having a cis-bond unit content of about 80%. However, the polymer is gel-like, and molecular weight, molecular weight distribution, control of a branched structure and living property of the polymer are not described in these references. Further, these references are silent on an introduction of a functional group in activated molecule terminals (hereinafter referred to "terminal modification"), and a reaction of activated molecule terminals with a reactive reagent (hereinafter referred to "coupling-agent") to give a polymer with a higher molecular weight (hereinafter referred to "coupling"). More specifically polymerization of butadiene using a catalyst prepared by previously contacting cyclopentadienyltitanium trichloride with methylaluminoxane is described in the above cited in Macromol. Chem. Rapid. Commun., 1990, vol. 11, p519, but polymerization conditions and effects thereof are not described.

Japanese Unexamined Patent Publication (hereinafter abbreviated to "JP-A") No. H8-113610 discloses polymerization of butadiene using a cyclopentadienyltitanium trichloride/methylaluminoxane/triethylaluminum catalyst to give a butadiene polymer having an Mw/Mn of 1.93. However, control of the branched polymer structure, living property of polymerization, and terminal modification and coupling of the polymer are not described.

JP-A H9-77818 discloses a catalyst for polymerization of a conjugated diene, comprising a combination of a transition metal compound, represented by the following formula (1), of group IV of the periodic table with an aluminoxane, which has a high activity and gives a polymer having controlled stereoregularity. It is described in this patent publication that, when butadiene is polymerized with this catalyst, a polymer having a cis-bond unit content of 96% was obtained. However, this patent publication is silent on molecular weight of the polymer, molecular weight distribution thereof, control of the branched polymer structure, living property of polymerization, and terminal modification and coupling of the polymer.

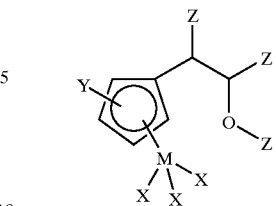

wherein M is a transition metal of group IV of the periodic table, X is hydrogen, a halogen, a C1–12 hydrocarbon group or a C1–12 hydrocarbon-oxy group, Y is a C1–20 hydrocarbon group which may form a ring together with the cyclopentadienyl group, Z is hydrogen or a C1–12 hydrocarbon group, and the pentagon with a circle therein represents a cyclopentadienyl ring structure (which is the same in the formula (3) below).

A metallocene catalyst comprising a transition metal compound of group IV of the periodic table, represented by the following formula (2):

$$MeO(CO)CH_2CpTiCl_3 \qquad (2)$$

wherein Me is a methyl group and Cp is a cyclopentadienyl ring structure (which is the same in the following chemical formulae), is described in Macromol. Chem., Macromol. Symp., 1997, vol. 118, p55–60. However, polymerization of a conjugated diene using this metallocene catalyst is not described therein.

Recently, it has been proposed to use the metallocene catalyst comprising the transition metal compound of group IV of the periodic table represented by the formula (2) for polymerization of butadiene in Preprint of the First Symposium on Technology for Novel High-Functional Materials; Industrial Science and Technology Frontier Program, Dec. 10, 1997, p77 (Japan). It is described that this polymerization proceeded with a high activity, and the resulting polybutadiene had a high cis-bond unit content and a molecular weight distribution somewhat narrower than the conventional high-cis butadiene polymers. However, control of the branched polymer structure, living property of polymerization, and terminal modification and coupling of the polymer are not described.

Butadiene polymers having a high molecular weight and at least 90% of a cis-bond unit content, prepared by using a typical coordinate polymerization catalyst containing cobalt, nickel, titanium or neodymium, are known. These butadiene polymers have a broad molecular weight distribution, and a large proportion of branched structures. Even a butadiene polymer having the smallest proportion of branched structure, prepared by using a neodymium-containing coordinate polymerization catalyst, satisfies the relationship between the root-mean-square radius (RMSR, nm) and the absolute molecular weight (MW, g/mol), represented by the following equation:

$$\log(RMSR)=0.638 \times \log(MW)-2.01$$

As for the butadiene polymers prepared by using a cobalt, nickel or titanium-containing coordinate catalyst, living property of polymerization, and terminal modification and coupling of the polymers are not known. As for the butadiene polymers prepared by using a neodymium-containing coordinate catalyst, it is known that the polymerization reaction is relatively living, but the content of living chains is not clear. It is presumed from WO 95/04090 that the maximum value of the content of living chains in the polymers with neodymium catalyst is 75%. However, as mentioned above, the polymers have a large proportion of branched structures and a broad molecular weight distribution, i.e., Mw/Mn of 3.1 or larger.

A process for producing a conjugated diene polymer by polymerization using a neodymium-containing coordinate catalyst followed by coupling is known (for example, JP-A S63-178102, JP-A S63-297403, JP-A S63-305101). However, the polymer before the coupling is presumed as having a broad molecular weight distribution, namely, Mw/Mn of at least about 3, from the GPC eluation curve. This polymer has a large proportion of branched structures and the degree of coupling is not clear.

With an organolithium catalyst, living polymerization of butadiene proceeds, and results in a terminal-modified polymer or a coupled polymer, which have a high molecular weight and a narrow molecular weight distribution, and are substantially free from a branched structure. But, the cis-bond unit content of the polymer is not more than 40%.

To sum up, according to the conventional techniques, it was impossible to produce a conjugated diene polymer by a stereospecifically highly active living polymerization procedure, and also to obtain a conjugated diene polymer having a high molecular weight and a narrow molecular weight distribution, and substantially not having a branched structure, and having a high cis-bond unit content. It was also impossible to produce a butadiene polymer by a stereospecifically (i.e., in a manner by which a polymer with a high cis-bond unit content is obtained) highly active living polymerization procedure and to introduce a functional group to a molecule chain terminal or effect coupling.

DISCLOSURE OF THE INVENTION

In view of the foregoing, an object of the present invention is to provide a butadiene polymer having a high living chain content and a high 1,4-cis-bond unit content, and substantially not having a branched structure.

Another object of the present invention is to provide a process for producing a conjugated diene polymer wherein a high living property of polymerization is attainable by controlling a polymerization temperature.

Still other objects of the present invention are to provide a butadiene polymer having a high cis-bond unit content, a narrow molecular weight distribution and a high degree of terminal modification, and to provide a process for producing a conjugated diene polymer by effecting polymerization using a specific metallocene catalyst, from which polymer a terminal-modified polymer is efficiently obtained by contacting the polymer with a reactive reagent.

Further objects of the present invention are to provide a coupled butadiene polymer having a high 1,4-cis-bond unit content and a narrow molecular weight distribution, and to provide a process for producing a conjugated diene polymer by effecting polymerization using a specific metallocene catalyst, from which polymer a coupled polymer is efficiently obtained by contacting the polymer with a coupling agent.

Thus, in one aspect of the present invention, there is provided a butadiene polymer which is a homopolymer of butadiene or a copolymer of butadiene with a monomer copolymerizable therewith, having at least 50% by weight of butadiene units, and characterized in that the content of butadiene units having a cis-bond in the total butadiene units is at least 50%, the number average molecular weight (Mn) is in the range of 1,000 to 10,000,000, and the butadiene polymer has at least 80%, based on the total molecular chains, of living chains containing a transition metal of group IV of the periodic table at a terminal thereof.

In another aspect of the present invention, there is provided a process for producing a conjugated diene polymer, characterized by polymerizing a conjugated diene monomer alone, or at least 50% by weight of a conjugated diene monomer with not more than 50% by weight of a monomer copolymerizable therewith at a temperature of not higher than 10° C. in the presence of a catalyst comprising (A) a compound of a transition metal of group IV of the periodic table having a cyclopentadienyl structural unit which may have a substituent, and (B) at least one co-catalyst selected from (a) an organoaluminum-oxy compound, (b) an ionic compound capable of reacting with the transition metal compound (A) to give a cationic transition metal compound, (c) a Lewis acid compound capable of reacting with the transition metal compound (A) to give a cationic transition metal compound, and (d) an organometallic compound having a main element metal of groups I to III of the periodic table.

In still another aspect of the present invention, there is provided a terminal-modified butadiene polymer which is a homopolymer of butadiene or a copolymer of butadiene with a monomer copolymerizable therewith, having at least 50% by weight of butadiene units, and characterized in that the content of butadiene units having a cis-bond in the total butadiene units is at least 50%; the number average molecular weight (Mn) is in the range of 1,000 to 10,000,000; the ratio (Mw/Mn) of weight average molecular weight (Mw) to number average molecular weight (Mn) is smaller than 3.0; a relationship represented by the formula:

$$\log(Mw/Mn) < 0.162 \times \log(Mw) - 0.682$$

is satisfied between the weight average molecular weight (Mw) and the ratio (Mw/Mn); and the butadiene polymer has at least 10%, based on the total polymer chains, of polymer chains having a functional group at a terminal thereof.

In a further aspect of the present invention, there is provided a process for producing a terminal-modified conjugated diene polymer, characterized by the steps of:

polymerizing a conjugated diene monomer alone, or at least 50% by weight of a conjugated diene monomer with not more than 50% by weight of a monomer copolymerizable therewith in the presence of a catalyst comprising (A) a compound of a transition metal of group IV of the periodic table having a cyclopentadienyl structural unit, and (B) at least one co-catalyst selected from (a) an organoaluminum-oxy compound, (b) an ionic compound capable of reacting with the transition metal compound (A) to give a cationic transition metal compound, (c) a Lewis acid compound capable of reacting with the transition metal compound (A) to give a cationic transition metal compound, and (d) an organometallic compound having a main element metal of groups I to III of the periodic table, said transition metal compound (A) being or having been contacted with said co-catalyst under conditions satisfying the following formulae (α) and (β):

$$-100 < T < 80 \tag{$\alpha$}$$

$$0.017 < t < 6000 \times \exp(-0.0921 \times T) \tag{$\beta$}$$

wherein t is contact time (minutes) and T is contact temperature (° C.); and then, contacting the thus-produced conjugated diene polymer with a reagent capable of reacting with a living polymer having a transition metal of group IV of the periodic table at a terminal thereof.

In a further aspect of the present invention, there is provided a coupled butadiene polymer composition characterized by comprising:

(I) 0 to 90 parts by weight of a polymer which is a homopolymer of butadiene or a copolymer of butadiene with a monomer copolymerizable therewith, and has at least 50% by weight of butadiene units, and in which the content of butadiene units having a cis bond in the total butadiene units is at least 50%, the number average molecular weight (Mn) is in the range of 1,000 to 10,000,000, and a relationship represented by the formula:

$$\log(Mw/Mn) < 0.162 \times \log(Mw) - 0.682$$

is satisfied between the weight average molecular weight (Mw) and the ratio (Mw/Mn); and (II) 100 to 10 parts by weight of a polymer composed of at least two molecules of the above-mentioned polymer (I), bonded through a coupling agent.

In a further aspect of the present invention, there is provided a process for producing a coupled conjugated diene polymer, characterized by the steps of:

polymerizing a conjugated diene monomer alone, or at least 50% by weight of a conjugated diene monomer with not more than 50% by weight of a monomer copolymerizable therewith in the presence of a catalyst comprising (A) a compound of a transition metal of group IV of the periodic table having a cyclopentadienyl structural unit, and (B) at least one co-catalyst selected from (a) an organoaluminum-oxy compound, (b) an ionic compound capable of reacting with the transition metal compound (A) to give a cationic transition metal compound, (c) a Lewis acid compound capable of reacting with the transition metal compound (A) to give a cationic transition metal compound, and (d) an organometallic compound having a main element metal of groups I to III of the periodic table, said transition metal compound (A) being or having been contacted with said co-catalyst under conditions satisfying the following formulae (α) and (β):

$$-100 < T < 80 \quad (\alpha)$$

$$0.017 < t < 6000 \times \exp(-0.0921 \times T) \quad (\beta)$$

wherein t is contact time (minutes) and T is contact temperature (° C.); and then, contacting the thus-produced conjugated diene polymer with a coupling agent capable of reacting with a living polymer having a transition metal of group IV of the periodic table at a terminal thereof.

BEST MODE FOR CARRYING OUT THE INVENTION

Polymerization Catalyst

The catalyst used for polymerization of a conjugated diene in the present invention is prepared from (A) a compound of a transition metal of group IV of the periodic table having a cyclopentadienyl structural unit which may have a substituent, and (B) at least one co-catalyst selected from (a) an organoaluminum-oxy compound, (b) an ionic compound capable of reacting with the transition metal compound (A) to give a cationic transition metal compound, (c) a Lewis acid compound capable of reacting with the transition metal compound (A) to give a cationic transition metal compound, and (d) an organometallic compound having a main element metal of groups I to III of the periodic table.

Transition Metal Compound (A)

The transition metal compound (A) is a compound of a transition metal of group IV of the periodic table having as a ligand one or more cyclopentadienyl structural units, preferably one cyclopentadienyl structural unit, which may have a substituent. The compound (A) is called as a half-metallocene compound or a constrained geometric catalyst, and is the main constituent of the catalyst used in the present invention. The cyclopentadienyl structural unit used herein broadly includes not only a cyclopentadienyl structure but also fused rings formed from a cyclopentadieny structure with another ring structure, for example, indene structure and fluorene structure. More specifically the cyclopentadienyl structure includes those which are represent by the following formula (3):

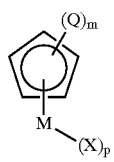

(3)

wherein M is a transition metal of group IV of the periodic table, X is hydrogen, a halogen, a C1–12 hydrocarbon group, a C1–12 hydrocarbon-oxy group, or an amino group which may have a C1–12 hydrocarbon group as a substituent. Two or more of X may be the same as or different from each other. X may form a polycyclic structure together with a part of the unsubstituted or substituted cyclopentadienyl structure, through a direct bond or an intervening cross-linking group. p is an integer of 2 or 3, and m is an integer of 0 to 5. Q is an organic group, and, when m is an integer of 2 or larger, two or more of Q may be the same as or different from each other. Q may form a polycyclic structure together with a part of the unsubstituted or substituted cyclopentadienyl structure, through a direct bond or an intervening cross-linking group.

The transition metal M of group IV of the periodic table in formula (3) is preferably titanium, zirconium or hafnium. Titanium is most preferable.

The halogen as an example of X in formula (3) includes fluorine, chlorine, bromine and iodine atoms. Of these, a chlorine atom is most preferable.

The C1–12 hydrocarbon group as an example of X in formula (3) includes, for example, alkyl groups such as methyl and neopentyl, and aralkyl groups having 7 to 12 carbon atoms such as benzyl.

The C1–12 hydrocarbon-oxy group as an example of X in formula (3) includes, for example, alkoxy groups having 1 to 12 carbon atoms such as methoxy, ethoxy and isopropoxy, and aralkyloxy groups having 7 to 12 carbon atoms such as benzyloxy.

The amino group, which may have a C1–12 hydrocarbon group as a substituent, as an example of X in formula (3) includes, for example, dialkylamino groups having 1 to 12 carbon atoms in each alkyl group, such as dimethylamino, diethylamino, diisopropylamino, dibutylamino and di-t-butylamino.

When X forms a polycyclic structure together with a part of the unsubstituted or substituted cyclopentadienyl structure through a cross-linking group, the cross-linking group used includes, for example, hydrocarbon groups having 1 to 14 carbon atoms, such as dimethylmethylene and diphenylmethylene, and silylene groups containing a hydrocarbon group having 1 to 24 carbon atoms, such as methylsilylene, dimethylsilylene, methylphenylsilylene, diphenylsilylene, dibenzylsilylene and tetramethyldisilylene.

As specific examples of the polycyclic structure formed from X which is bonded with a part of the unsubstituted or substituted cyclopentadienyl structure, through a direct bond or an intervening cross-linking group, there can be mentioned an indenyl group and a fluorenyl group.

p, i.e., the number of X in one molecule of the transition metal compound (A), is an integer of 2 or 3, preferably 3.

As specific examples of the organic group Q, there can be mentioned alkyl groups having 1 to 20 carbon atoms such as methyl, ethyl, propyl, isopropyl, butyl, t-butyl, hexyl, octyl, cyclohexyl and adamantyl; aryl groups having 6 to 20 carbon atoms such as phenyl; aralkyl groups having 7 to 30 carbon atoms such as benzyl and triphenylmethyl; hydrocarbon groups containing a silicon atom such as trimethylsilyl; hydrocarbon groups containing a tin atom such as trimethylstannyl; hydrocarbon groups containing a germanium atom such as trimethylgermyl; and groups having a Lewis base atomic group with a heteroatom, such as ether, thioether, carbonyl, sulfonyl, ester, thioester, tertiary amino, secondary amino, primary amino, amide, phosphino and phosphinyl.

As specific examples of the polycyclic structure formed from the organic group Q which is bonded with a part of the unsubstituted or substituted cyclopentadienyl structure, through a direct bond or an intervening cross-linking group, there can be mentioned an indenyl group and a fluorenyl group.

Among the above-recited examples of the organic group Q, bulky hydrocarbon groups having 3 to 30 carbon atoms such as trimethylsilyl, t-butyl and triphenylmethyl, and groups having a Lewis base atomic group with a heteroatom, are preferable because the polymerization activity and the content of cis-bond unit in polymer are enhanced.

m, i.e., the number of the organic group Q in one molecule of the transition metal compound (A), is an integer of 0 to 5. m is preferably at least 1 in view of the high cis-bond unit content in the resulting conjugated diene polymer. When m is at least 2, two or more of the organic group Q may be the same as or different from each other.

As specific examples of the transition metal compound (A) wherein M is titanium, p is 3 and X is chlorine, there can be mentioned the following compounds (1) through (12).

(1) Cyclopentadienyltitanium trichloride wherein m is 0 and which has an unsubstituted cyclopentadienyl group;

(2) Mono-substituted cyclopentadienyltitanium trichloride wherein m is 1 and which has a monocyclic substituted cyclopentadienyl group, such as methylcyclopentadienyltitanium trichloride, trimethylsilylcyclopentadienyltitanium trichloride, t-butylcyclopentadienyltitanium trichloride, triphenylmethylcyclopentadienyltitanium trichloride, adamantylcyclopentadienyltitanium trichloride, (2-methoxyethyl)cyclopentadienyltitanium trichloride $(MeOCH_2CH_2CpTiCl_3)$, [2-(t-butoxy)ethyl] cyclopentadienyltitanium trichloride $(t-BuOCH_2CH_2CpTiCl_3;$ "t-Bu" hereinafter means t-butyl), phenoxyethylcyclopentadienyltitanium trichloride $(PhOCH_2CH_2CpTiCl_3;$ "Ph" hereinafter means phenyl), 2-(2-methoxyethoxy)ethylcyclopentadienyltitanium trichloride $(MeOCH_2CH_2OCH_2CH_2CpTiCl_3)$, methoxycarbonylmethylcyclopentadienyltitanium trichloride [MeO(CO)$CH_2CpTiCl_3$], t-butoxycarbonylmethylcyclopentadienyltitanium trichloride [t-BuO(CO)$CH_2CpTiCl_3$], phenoxycarbonylmethylcyclopentadienyltitanium trichloride, 2-(N,N-dimethylamino)ethylcyclopentadienyltitanium trichloride $(Me_2NCH_2CH_2CpTiCl_3)$, 2-(N,N-diethylamino)ethyl-cyclopentadienyltitanium trichloride $(Et_2NCH_2CH_2CpTiCl_3;$ "Et" hereinafter means ethyl), and 2-(N,N-diisopropylamino)ethylcyclopentadienyltitanium trichloride $(i-Pr_2NCH_2CH_2CpTiCl_3;$ "i-Pr" hereinafter means isopropyl);

(3) Di-substituted cyclopentadienyltitanium trichloride wherein m is 2 and which has a monocyclic substituted cyclopentadienyl group, such as (1-methyl)(2-trimethylsilyl)cyclopentadienyltitanium trichloride, (1-t-butyl)[3-(2-methoxyethyl)]cyclopentadienyltitanium trichloride, (1-trimethylsilyl)(3-methoxycarbonylmethyl)-cyclopentadienyltitanium trichloride and (1-phenyl){3-[2-(N,N-diethylamino)ethyl]}cyclopentadienyltitanium trichloride;

(4) Tri-substituted cyclopentadienyltitanium trichloride wherein m is 3 and which has a monocyclic substituted cyclopentadienyl group, such as (1,2-dimethyl)(4-trimethylsilyl)cyclopentadienyltitanium trichloride, (1,2-dimethyl)[4-(2-methoxyethyl)]cyclopentadienyltitanium trichloride, (1,2-dimethyl)[4-methoxycarbonylmethyl)-cyclopentadienyltitanium trichloride and (1,2-dimethyl){4-[2-(N,N-diethylamino)ethyl]}cyclopentadienyltitanium trichloride;

(5) Tetra-substituted cyclopentadienyltitanium trichloride wherein m is 4 and which has a monocyclic substituted cyclopentadienyl group, such as (1,2,3-trimethyl)(4-trimethylsilyl)cyclopentadienyltitanium trichloride, (1,2,4-trimethyl)[3-(2-methoxyethyl)cyclopentadienyltitanium trichloride, (1,2,3-trimethyl)(4-methoxycarbonylmethyl)cyclopentadienyltitanium trichloride and (1,2,3-trimethyl){4-[2-(N,N-diethylamino)ethyl]}cyclopentadienyltitanium trichloride;

(6) Penta-substituted cyclopentadienyltitanium trichloride wherein m is 5 and which has a monocyclic substituted cyclopentadienyl group, such as pentamethylcyclopentadienyltitanium trichloride, pentaphenylcyclopentadienyltitanium trichloride, (tetramethyl)-(trimethylsilyl)cyclopentadienyltitanium trichloride, (tetramethyl)(2-methoxyethyl)cyclopentadienyltitanium trichloride, (tetramethyl)(methoxycarbonylmethyl)-cyclopentadienyltitanium trichloride and (tetramethyl)[2-(N,N-diethlamino)ethyl]cyclopentadienyltitanium trichloride;

(7) Indenyltitanium trichloride wherein m is 1 and which has a substituted or unsubstituted indenyl group having no substituent on the cyclopentadiene ring, such as indenyltitanium trichloride and (4-methyl)indenyltitanium trichloride;

(8) Substituted indenyltitanium trichloride wherein m is 2 and which has a substituent on the cyclopentadiene ring, such as (trimethylsilyl)indenyltitanium trichloride, [1-(2-methoxyethyl)]indenyltitanium trichloride, (2-methoxycarbonylmethyl) indenyltitanium trichloride , {1-[2-(N,N-diethylamino)ethyl]}indenyltitanium trichloride and (4-methyl)(trimethylsilyl)indenyltitanium trichloride;

(9) Substituted indenyltitanium trichloride wherein m is 3 and which has two substituents on the cyclopentadiene ring, such as (1-trimethylsilyl)(3-methyl)indenyltitanium trichloride, [1-(2-methoxyethyl)](3-methyl)indenyltitanium trichloride, (2-methoxycarbonylmethyl)(3-methyl)indenyltitanium trichloride, {1-[2-(N,N-diethylamino)ethyl]}(3-methyl)indenyltitanium trichloride and (3,4-dimethyl)(1-trimethylsilyl)indenyltitanium trichloride;

(10) Substituted indenyltitanium trichloride wherein m is 4 and which has three substituents on the cyclopentadiene ring, such as (1-trimethylsilyl)(2,3-dimethyl)indenyltitanium trichloride, [1-(2-methoxyethyl)](2,3-dimethyl)-indenyltitanium trichloride, (2-methoxycarbonylmethyl)-(1,3-dimethyl)indenyltitanium trichloride, {1-[2-(N,N-diethylamino)ethyl]}(2,3-dimethyl)indenyltitanium trichloride and (2,3,4-trimethyl)(1-trimethylsilyl)-indenyltitanium trichloride;

(11) Substituted or unsubstituted fluorenyltitanium trichloride wherein m is 2 and which has no substituent on the cyclopentadiene ring, such as fluorenyltitanium trichloride and 2-methylfluorenyltitanium trichloride;

(12) Substituted fluorenyltitanium trichloride wherein m is 3 and which has a substituent on the cyclopentadiene ring, such as (9-trimethylsilyl)fluorenyltitanium trichloride, [9-(2-methoxyethyl)]fluorenyltitanium trichloride, (9-methoxycarbonylmethyl)fluorenyltitanium trichloride, {9-[2-(N,N-diethylamino)ethyl]}fluorenyltitanium trichloride and (1-methyl)(9-trimethylsilyl)fluorenyltitanium trichloride.

The transition metal compound (A) further includes, for example, those which have a transition metal other than titanium, those in which a part or the entirety of X is a halogen other than chlorine, those in which a part or the entirety of X is a hydrocarbon group, a hydrocarbon-oxy group or an amide group, those in which X forms a cyclic structure together with the organic group Q, and those in which p is an integer of 2.

As specific examples of these transition metal compounds (A), there can be mentioned the following compounds.

(13) Zirconium- or hafnium-containing compounds corresponding to the titanium-containing compounds as recited above in (1) through (12). The zirconium- or hafnium-containing compounds include, for example, cyclopentadienylzirconium trichloride, (trimethylsilyl)-cyclopentadienylzirconium trichloride, (2-methoxyethyl)-indenylhafnium trichloride, (methoxycarbonylmethyl)-fluorenylzirconium trichloride and [2-(N,N-diethylamino)-ethyl] cyclopentadienylzirconium trichloride;

(14) Compounds containing fluorine, bromine or iodine instead of a part or the entirety of the chlorine atoms in the transition metal compounds as recited above in (1) through (13). The fluorine-, bromine- or iodine-containing compounds include, for example, (trimethylsilyl)cyclopentadienyl-titanium trifluoride, (2-methoxyethyl)cyclopentadienyl-titanium tribromide, (methoxycarbonylmethyl)-cyclopentadienyltitanium triiodide and [2-(N,N-diethylamino)ethyl]cyclopentadienyltitanium triiodide;

(15) Compounds having a hydrocarbon group bonded to the transition metal of group IV of the periodic table instead of a part or the entirety of the halogen atoms bonded to the transition metal of group IV of the periodic table in the compounds as recited above in (1) through (14). The hydrocarbon group-containing compounds include, for example, (trimethylsilyl)cyclopentadienyltitanium trimethyl, (2-methoxyethyl)cyclopentadienyltitanium tribenzyl, (methoxycarbonylmethyl)cyclopentadienyltitanium trimethyl and [2-(N,N-diethylamino)ethyl]cyclopentadienyltitanium trimethyl;

(16) Compounds having a hydrocarbon-oxy group bonded to the transition metal M of group IV of the periodic table instead of a part or the entirety of the halogen atoms or hydrocarbon groups, bonded to the transition metal M of group IV of the periodic table in the compounds as recited above in (1) through (15). The hydrocarbon-oxy group-containing compounds include, for example, (trimethylsilyl)cyclopentadienyl-titanium trimethoxide, (2-methoxyethyl)cyclopentadienyl-titanium tributoxide, (methoxycarbonylmethyl)cyclopentadienyl-titanium triethoxide and [2-(N,N-diethylamino)ethyl]-cyclopentadienyltitanium tributoxide;

(17) Compounds having an amide group bonded to the transition metal M of group IV of the periodic table instead of a part or the entirety of the halogen atoms, hydrocarbon groups or hydrocarbon-oxy groups, bonded to the transition metal M of group IV of the periodic table in the compounds as recited above in (1) through (16). The amide group-containing compounds include, for example, (trimethylsilyl)cyclopentadienyltitanium trisdimethylamide, (2-methoxyethyl)-cyclopentadienyltitanium trisdiethylamide, (methoxycarbonylmethyl)cyclopentadienyltitanium trisdipropylamide and [2-(N,N-diethylamino)ethyl]-cyclopentadienyltitanium tris-dioctylamide;

(18) Compounds having a cyclic structure, which is formed at least one of X together with the organic group Q through a direct bond or an intervening cross-linking group, instead of X and the organic group Q in the compounds as recited above in (1) through (17). The compounds having such a cyclic structure include, for example, [t-butyl(dimethylcyclopentadienylsilyl)amide]dichlorotitanium, [t-butyl(dimethylcyclopentadienylsilyl)amide]-dimethyltitanium, [t-butyl(dimethylcyclopentadienylsilyl)amide]-dimethylzirconium and [t-butyl(dimethylfluorenylsilyl)amide]dimethyltitanium; and

(19) Compounds, which are the same as the compounds recited above in (1) through (18), except that p is an integer of 2.

The compounds with p of 2 include, for example, cyclopentadienyltitanium dichloride, methyl-cyclopentadienyltitanium dichloride, trimethylsilyl-cyclopentadienyltitanium dichloride, t-butyl-cyclopentadienyltitanium dichloride, triphenylmethyl-cyclopentadienyltitanium dichloride, adamantyl-cyclopentadienyltitanium dichloride, (trimethylsilyl)-cyclopentadienyltitanium dimethoxide, (trimethylsilyl)-cyclopentadienyltitanium bisdimethylamide and [t-butyl(dimethyl-cyclopentadienylsilyl)amide]chlorotitanium.

Among the above-recited transition metal compounds of (1) through (19), compounds of (1), (2), (7), (8), (11), (12), and compounds of (13) through (19), which correspond to compounds of (1), (2), (7), (8), (11) and (12), are preferable. Compounds of (1) and (2), and compounds of (13) to (19), corresponding to (1) and (2), are more preferable. Compounds of (2) and compounds of (13) through (17) corresponding to (2), and compounds of (19) corresponding to (2) are far more preferable. Compounds of (2) are most preferable.

Among the transition metal compounds (A), as recited above, those which have a substituent containing at least one atomic group selected from carbonyl, sulfonyl, ether and thioether groups on the cyclopentadiene ring are preferable. Such transitional metal compounds preferably include transition metal compounds represented by the following formulae (4) and (5). Those of formula (4) are especially preferable.

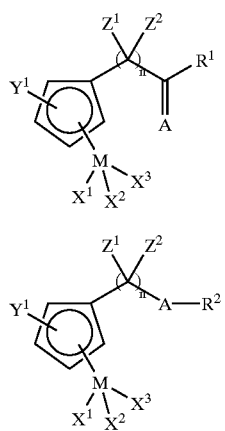

In formulae (4) and (5), M is a transition metal of group IV of the periodic table, and $X^1$, $X^2$ and $X^3$ may be the same or different, and are hydrogen, a halogen, a C1–12 hydrocarbon group or a C1–12 hydrocarbon-oxy group. $Y^1$ is hydrogen or a C1–20 hydrocarbon group, and may form a cyclic structure together with the cyclopentadienyl structure. $Z^1$ and $Z^2$ are hydrogen or a C1–12 hydrocarbon group, and may be the same or different. A is oxygen or sulfur, and n is an integer of 0 to 5.

In formula (4), $R^1$ is hydrogen, a C1–12 hydrocarbon group, a C1–12 hydrocarbon-oxy group or a C1–12 hydrocarbon-thio group. In formula (5), $R^2$ is a C1–12 hydrocarbon group.

The transition metal compounds of formulae (4) and (5) are more preferably metallocene compounds having as ligand one cyclopentadienyl group, a cyclopentadienyl group having a substituent such as an alkyl, aryl or cycloalkyl group, or a polycyclic structure formed by bonding a cyclopentadienyl group together with a substituent, wherein the cyclopentadienyl group in the ligand has at least one atomic group selected from a >CO structure, a >C=S structure, a —C—O—C— structure and a —C—S—C— structure in the substituent.

As specific examples of the transition metal compound (A) of formula (4), there can be mentioned $MeO(CO)CH_2CpTiCl_3$, $MeO(CO)CH(Me)CpTiCl_3$ and $\{3\text{-}[MeO(CO)CH_2]\}(1\text{-}Me)CpTiCl_3$. As a specific example of the transition metal compound (A) of formula (5), there can be mentioned $MeOCH_2CH_2CpTiCl_3$.

The method by which the transition metal compound (A) is prepared is not particularly limited. For example, $MeO(CO)CH_2CpTiCl_3$ of formula (4) is prepared by the method described in Macromol. Symp., 1997, vol. 118, p55–60, and $MeOCH_2CH_2CpTiCl_3$ of formula (5) is prepared by the method described in Transition Met. Chem., 1990, vol. 15, p483.

Co-catalyst (B)

Among the co-catalysts (B) used in combination with the above-mentioned compound (A) of transition metal of group IV of the periodic table, the organoaluminum-oxy compound (a) preferably includes straight-chain or cyclic polymers represented by the following formula (6), namely, aluminoxane:

wherein $R^5$ is a C1–10 hydrocarbon group which is unsubstituted or substituted with a substituent selected from a halogen and an $R^6O$ group ($R^6$ is a C1–12 hydrocarbon group), and n is an integer of at least 5, preferably at least 10, and preferably not larger than 100 and more preferably not larger than 50.

As specific examples of the C1–10 hydrocarbon group, there can be alkyl groups such as methyl, ethyl, propyl and isobutyl. Of these, a methyl group is preferable.

Among the co-catalyst (B), the ionic compound (b) capable of reacting with the transition metal compound (A) to form a cationic transition metal compound includes an ionic compound which is formed by bonding a non-coordinating anion with a cation.

As specific examples of the non-coordinating anion, there can be mentioned tetra(phenyl)borate, tetra(fluorophenyl) borate, tetrakis(difluorophenyl)borate, tetrakis(trifluorophenyl)borate, tetrakis-(tetrafluorophenyl)borate, tetrakis(pentafluorophenyl) borate, tetrakis (tetrafluoromethylphenyl)borate, tetra(toluyl)borate, tetra(xylyl)borate, triphenyl-pentafluorophenyl borate and tris (pentafluorophenyl)phenyl borate.

As specific examples of the cation, there can be mentioned carbonium cations, oxonium cations, ammonium cations, phosphonium cations and ferrocenium cations having a transition metal.

As specific examples of the carbonium cations, there can be mentioned tri-substituted cations such as triphenylcarbonium cation and tri-substituted phenylcarbonium cations. The tri-substituted phenylcarbonium cations include, for example, tri(methylphenyl)carbonium cation and tri (dimethylphenyl)carbonium cation.

As specific examples of the oxonium cations, there can be mentioned alkyloxonium cations such as hydroxonium cation ($OH_3^+$) and methyloxonium cation ($CH_3OH_2^+$); dialkyloxonium cations such as dimethyloxonium cation [$(CH_3)_2OH^+$]; and trialkyloxonium cations such as trimethyloxonium cation [$(CH_3)_3O^+$] and triethyloxonium cation [$(C_2H_5)_3O^+$].

As specific examples of the ammonium cations, there can be mentioned trialkylammonium cations such as trimethylammonium cation, triethylammonium cation, tripropylammonium cation and tributylammonium cation; N,N-dialkylanilinium cations such as N,N-diethylanilinium cation; and dialkylammonium cations such as di(isopropyl) ammonium cation and dicyclohexylammonium cation.

As specific examples of the phosphonium cations, there can be mentioned triarylphosphonium cations such as triphenylphosphonium cation, tri(methylphenyl)phosphonium cation and tri(dimethylphenyl)phosphonium cation.

Of the ionic compounds, triphenylcarbonium-tetra (pentafluorophenyl)borate, N,N-dimethylanilinium-tetra (pentafluorophenyl)borate and 1,1'-diemthylferrocenium-tetra(pentafluorophenyl)borate are preferable.

Among the co-catalysts (B), as specific examples of the Lewis acid compound (c) capable of reacting with the transition metal compound (A) to form a cationic transition metal compound, there can be mentioned tris(pentafluorophenyl)boron, tris(monofluorophenyl)boron, tris(difluorophenyl)boron and triphenylborin.

Among the co-catalysts (B), the organometallic compound (d) having a main element metal of groups I to III of the periodic table includes not only organometallic compounds in a narrow sense, i.e., compounds of a hydrocarbon with a main element metal of groups I to III of the periodic table, but also organometallic halide compounds having the metal and organometallic hydride compounds having the metal. As specific examples of the organometallic compound in a narrow sense, there can be mentioned methyllithium, butyllithium, phenyllithium, dibutylmagnesium, trimethylaluminum, triethylaluminum, triisobutylaluminum, trihexylaluminum and trioctylaluminum. Of these, a trialkylaluminum is preferable. As specific examples of the organometallic halide compound, there can be mentioned ethylmagnesium chloride, butylmagnesium chloride, dimethylaluminum chloride, diethylaluminum chloride, sesquiethylaluminum chloride and ethylaluminum dichloride. As specific examples of the organometallic hydride compound, there can be mentioned diethylaluminum hydride and sesquiethylaluminum hydride.

The above-recited compounds (a) to (d) may be used either alone or in combination as the co-catalyst (B) in the present invention. Of these, (a) alone, (c) alone, a combination of (a) with (d), a combination of (b) with (d) and a combination of (c) with (d) are preferable.

When the transition metal compound (A) is a cyclopentadienyl structure having a substituent having at least one atomic group selected from a carbonyl group, a sulfonyl group, an ether group and a thioether group, the co-catalyst (B) is preferably aluminoxane (a) or the ionic compound (d) capable of reacting with the transition metal compound (A) to form a cationic transition metal compound. In this case, the ionic compound (d) is preferably an ionic compound of an anion of tetrakis(pentafluorophenyl)borate with a cation selected from an amine cation having an active proton such as $(CH_3)_2N(C_6H_5)H^+$, a tri-substituted carbonium cation such as $(C_6H_5)_3C^+$, a carboran cation, a metal carboran cation and a ferrocenium cation having a transition metal.

The polymerization can be carried out in the co-presence of a metal hydride. As specific examples of the metal hydride, there can be mentioned NaH, LiH, CaH, $LiAlH_4$ and $NaBH_4$.

Supported Catalyst

The transition metal compound (A) and/or the co-catalyst (B) can be used in a state of being supported by a carrier. The carrier includes those which are composed of inorganic compounds and organic high polymers.

The inorganic compounds preferably include inorganic oxides, inorganic chlorides and inorganic hydroxides, which may contain a minor amount of a carbonate salt or a sulfate salt. Inorganic oxides such as silica, alumina, magnesia, titania, zirconia and calcia, and inorganic chlorides such as magnesium chloride are especially preferable. These inorganic compounds are preferably finely divided porous particles having an average particle diameter of 5 to 150 $\mu$m and a specific surface area of 2 to 800 $m^2/g$. The finely divided porous particles can be used after moisture is removed by heat-treating the particles, for example, at a temperature of 100 to 800° C.

The organic high polymers preferably have an aromatic ring, a substituted aromatic ring or a functional group such as hydroxyl, ester or halogen at side chains. As specific examples of the organic high polymers, there can be mentioned $\alpha$-olefin homopolymers having a functional group which is prepared by chemically modifying $\alpha$-olefin homopolymers having, for example, etylene, propylene or butene units; $\alpha$-olefin copolymers; polymers having units of acrylic acid, methacrylic acid, vinyl chloride, vinyl alcohol, styrene or divinylbenzene; and chemically modified polymers thereof.

The carrier composed of the organic high polymer is usually spherical particles having an average particle diameter of 5 to 250 $\mu$m.

When the transition metal compound (A) and/or the co-catalyst (B) are used in a state of being supported by a carrier, contamination of a polymerization reactor can be avoided because these ingredients (A) and/or (B) are not deposited on the reactor.

Monomers

Conjugated Diene Monomers

Conjugated diene monomers used in the present invention include, for example, 1,3-butadiene, 2-methyl-1,3-butadiene, 2,3-dimethyl-1,3-butadiene, 2-chloro-1,3-butadiene, 1,3-pentadiene and 1,3-hexadiene. Of these conjugated diene monomers, 1,3-butadiene and 2-methyl-1,3-butadiene are preferable. 1,3-butadiene is most preferable. These conjugated diene monomers may be used either alone or in combination, but use of 1,3-butadiene alone is most preferable.

Copolymerizable Monomers

As specific examples of the monomers copolymerizable with the conjugated diene monomers, there can be mentioned aromatic vinyl monomers such as styrene, o-methylstyrene, p-methylstyrene, m-methylstyrene, 2,4-dimethylstyrene, ethylstyrene, p-tert-butylstyrene, $\alpha$-methylstyrene, $\alpha$-methyl-p-methylstyrene, o-chlorostyrene, m-chlorostyrene, p-chlorostyrene, p-bromostyrene, 2-methyl-1,4-dichlorostyrene, 2,4-dibromostyrene and vinylnaphthalene; cycloolefins such as cyclopentene and 2-norbornene; non-conjugated dienes such as 1,5-hexadiene, 1,6-heptadiene, 1,7-octadiene, dicyclopentadiene and 5-ethylidene-2-norbornene; and acrylic acid esters, and methacrylic acid esters such as methyl methacrylate.

Process for Producing Conjugated Diene Polymers

The procedure by which a conjugated diene monomer alone, or a combination of at least 50% by weight of a conjugated diene monomer with not more than 50% by weight of a copolymerizable monomer is polymerized is not particularly limited. For example, the following procedures (i) through (vi) can be adopted by using the transition metal compound (A) and at least one of the co-catalyst (B).

(i) Transition metal compound (A) and co-catalyst (B) are previously contacted with each other, and, while transition metal compound (A) is kept in contact with co-catalyst (B), a monomer is placed in contact with transition metal compound (A) and co-catalyst (B) to effect polymerization.

(ii) Transition metal compound (A) and a monomer are previously contacted with each other, and, while transition metal compound (A) is kept in contact with the monomer, co-catalyst (B) is placed in contact with transition metal compound (A) and the monomer to effect polymerization.

(iii) Co-catalyst (B) and a monomer are previously contacted with each other, and, while co-catalyst (B) is kept in contact with the monomer, transition metal compound (A) is placed in contact with co-catalyst (B) and the monomer to effect polymerization.

(iv) Transition metal compound (A) and co-catalyst (B) are mixed together, the resultant mixture is contacted with a carrier to be thereby supported by the carrier, the thus prepared catalyst is separated, and then a monomer is contacted with the catalyst to effect polymerization.

(v) Transition metal compound (A) and a carrier are contacted with each other, the resultant compound (A)/carrier is contacted with co-catalyst (B) to prepare a catalyst comprising compound (A) plus co-catalyst (B), supported by the carrier, the thus-prepared catalyst is separated, and then a monomer is contacted with the catalyst to effect polymerization.

(vi) Co-catalyst (B) and a carrier are contacted with each other, the resultant co-catalyst (B)/carrier is contacted with transition metal compound (A) to prepare a catalyst comprising compound (A) plus co-catalyst (B), supported by the carrier, the thus-prepared catalyst is separated, and then a monomer is contacted with the catalyst to effect polymerization.

Of these procedures, procedures (i), (iv), (v) and (vi) are preferable because transition metal compound (A) and co-catalyst (B) are previously contacted with each other, and, after a lapse of aging time, a monomer is placed in contacted with the compound (A) and co-catalyst (B) while (A) and (B) are kept in contact with each other, and thus, the efficiency of polymerization initiator and the polymerization activity are enhanced, and the molecular weight distribution of polymer becomes narrower. Procedure (i) is most preferable. When butadiene is polymerized by this procedure, a butadiene polymer having a molecular weight distribution of below 3.0 as defined as the ratio (Mw/Mn) of weight average molecular weight (Mw) to number average molecular weight (Mn) is obtained. The Mw/Mn ratio can be easily lowered to not larger than 1.6, relatively easily lowered to below 1.5, and even possible to reach a value of not larger than 1.4.

Preferably the transition metal compound (A) and the co-catalyst (B) are aged at a temperature in the range of −100° C. to +80° C., more preferably −80° C. to +70° C. It is preferable that the following inequality (I) is satisfied between the aging time t(minutes) and aging temperature T(° C.) when a=0.017 and b=6,000, more preferably when a=0.083 and b=4,000, and most preferably a=0.17 and b=2,000. The aging time t(minutes) means the time spanning from the commencement of contact of transition metal compound (A) with co-catalyst (B) to the commencement of polymerization.

$$a < t < b \times \exp(-0.0921 \times T) \quad \text{(I)}$$

When the aging temperature is higher than +80° C., the intended aging effect cannot be obtained. In contrast, when the aging temperature is lower than −100° C., the aging is not advantageous from an economical view point. Any problem does not arise even when the aging is carried out at a low temperature for a long time while the compound (A) is kept in contact with co-catalyst (B). But, when the aging temperature is high, the catalyst is liable to be deactivated, and, when the aging time is long, polymerization becomes difficult to conduct. In contrast, a short aging time of shorter than 0.017 minute, i.e., within one second, cannot be actually employed.

The transition metal compound (A) and the co-catalyst (B) may be used either in a state of a solution or a slurry. A solution state is preferable because of high polymerization activity. As specific examples of a solvent used for the preparation of the solution or slurry, there can be mentioned hydrocarbons such as butane, pentane, hexane, heptane, octane, cyclohexane, mineral oil, benzene, toluene and xylene; and halogenated hydrocarbons such as chloroform, methylene chloride, dichloroethane and chlorobenzene. Of these, aromatic hydrocarbons such as benzene and toluene are preferable. These solvents may be used either alone or in combination.

The amount of the catalyst is preferably in the range of 100 to 0.01 m-mol, more preferably 10 to 0.1 m-mol, and most preferably 5 to 0.2 m-mol, as the amount of transition metal compound (A). The polymerization reaction of the present invention carried out at a specific temperature is a living polymerization as hereinafter mentioned. Therefore, the molecular weight of polymer can be controlled by varying the amount of transition metal compound (A) per unit amount of a monomer. For example, when the amount of transition metal compound (A) is in the range of 5 to 0.2 mols per mol of butadiene, a butadiene polymer having a very narrow molecular weight distribution, i.e., an Mw/Mn ratio of not larger than 1.6, preferably below 1.5, can easily be obtained.

The ratio by mol of organoaluminum-oxy compound (a) such as aluminoxane to the transition metal compound (A) is preferably in the range of 10 to 10,000, more preferably 100 to 5,000 and most preferably 200 to 3,000. The ratio by mol of the ionic compound (b) to the transition metal compound (A) is preferably in the range of 0.01 to 100, and more preferably 0.1 to 10. The ratio by mol of the Lewis acid compound (c) to the transition metal compound (A) is preferably in the range of 0.01 to 100, and more preferably 0.1 to 10. When an organometallic compound (d) is used, the ratio by mol of the organometallic compound (d) to the transition metal compound (A) is preferably in the range of 0.1 to 10,000, and more preferably 1 to 1,000. The above-mentioned amounts of co-catalyst (B) apply to the case where the respective ingredient (a), (b), (c) or (d) isusedalone. If two or more of co-catalysts (B) are used in combination, an appropriate amount thereof varies depending upon the particular proportion of the co-catalysts used.

The polymerization of a conjugated diene monomer alone or a combination of a conjugated diene monomer with a copolymerizable monomer can be carried out by a solution polymerization method using an inert solvent, a slurry polymerization method, and a bulk polymerization method wherein a monomer functions as a diluent. A vapor phase polymerization method using a vapor phase stirring vessel or a vapor phase fluidized bed may also be employed. Of these, a solution polymerization method is preferable because high living polymerization property and a polymer with a narrow molecular weight distribution are obtained. Any of batchwise, semi-batchwise and continuous polymerization methods may be employed.

The polymerization temperature is not particularly limited, but is usually not higher than 20° C., preferably in the range of −100° C. to +20° C., more preferably −80° C. to +15° C., and most preferably −60° C. to +10° C.

However, when a homopolymer of butadiene or a copolymer of at least 50% by weight of butadiene with not more than 50% by weight of a monomer copolymerizable therewith, characterized in that the content of butadiene units having a cis-bond in the total butadiene units is at least 50%, the number average molecular weight (Mn) is in the range of 1,000 to 10,000,000, and the butadiene polymer has at least 80%, based on the total molecular chains, of living chains containing a transition metal of group IV of the periodic table at a terminal thereof, is produced, the polymerization temperature is not higher than +10° C., usually in the range of −100° C. to +10° C., preferably −80° C. to +10° C., and more preferably −60° C. to +10° C.

A low polymerization temperature is preferable from a view point such that a high living polymerization property is attained to give a polymer having a reduced number of branched structure, and the rate of initiation reaction relative to the rate of propagation reaction is enhanced to give a polymer having a narrow molecular weight distribution. But, a too low polymerization temperature is sometimes difficult to maintain.

The polymerization time is usually in the range of 1 second to 360 minutes, and the polymerization pressure is usually in the range of atmospheric pressure to 30 kg/cm$^2$. The inert solvent used may be selected from those recited above, and may be used either alone or as a mixture.

A polar compound may be incorporated in the polymerization system, which includes, for example, ethers such as ethyl ether, diglyme, tetrahydrofuran and dioxane, and amines such as triethylamine and tetramethylethylenediamine.

A chain transfer agent can be incorporated in the polymerization system to control the molecular weight of polymer. Chain transfer agents which are generally used for the production of cis-1,4-polybutadiene rubber can be used. As preferable examples of the chain transfer agent, there can be mentioned allenes such as 1,2-butadiene, cyclic dienes such as cyclooctadiene, and hydrogen.

The termination of polymerization can be effected usually by incorporating a polymerization stopper in the polymerization system when the desired conversion is reached. The polymerization stopper used includes, for example, alcohols such as methanol, ethanol, propanol, butanol and isobutanol. These alcohols may be incorporated with an acid such as hydrochloric acid.

By termination of polymerization, the bond between the terminal of polymer chain and the transition metal of group IV of the periodic table is severed, and the polymerization reaction stops. The polymer having a transition metal of group IV of the periodic table bonded at a terminal thereof is called "a living polymer", and, the polymer from which the transition metal is severed by the termination of polymerization is called "a dead polymer". By the term "polymer" hereinafter used, we mean both of the living polymer and the dead polymer.

The procedure of recovering a polymer after the termination of polymerization is not particularly limited. For example, a steam-stripping procedure and a procedure of depositing a polymer with a poor solvent can be used.

An antioxidant can be incorporated in a polymer at any step during the course spanning from the termination of polymerization to the final drying of polymer. Especially when the polymer is heated to a temperature at which the polymer is thermally degraded, for example, at a heat-drying step, an antioxidant is added preferably before the polymer is heated to that temperature. The antioxidant includes, for example, phenolic stabilizers, sulfur-containing stabilizers, phosphorus-containing stabilizers and amine stabilizers.

The phenolic stabilizers are described, for example, in JP-A H4-252243. As specific examples of the phenolic stabilizers, there can be mentioned 2,6-di-tert.-butyl-4-methylphenol, 2,6-di-tert.-butyl-4-ethylphenol, 2,6-di-tert.-butyl-4-butylphenol, 2,6-di-tert.-butyl-4-isobutylphenol, 2-tert.-butyl-4,6-dimethylphenol, 2,4,6-tricyclohexylphenol, 2,6-di-tert.-butyl-4-methoxylphenol, 2,6-di-phenol-4-octadecyloxyphenol, n-octadecyl-3-(3',5'-di-tert.-butyl-4-hydroxyphenyl)propionate, tetrakis-[methylene-3-(3',5'-di-tert.-butyl-4'-hydroxyphenyl)-propionate]-methane, 1,3,5-trimethyl-2,4,6-tris(3,5-di-tert.-butyl-4-hydroxybenzyl)benzene, 2,4-bis-(octylthiomethyl)-6-methylphenol, 2,4-bis(2',3'-dihydroxypropylthiomethyl)-3,6-dimethylphenol and 2,4-bis(2'-acetyloxyethylthiomethyl)-3,6-dimethylphenol.

As specific examples of the sulfur-containing stabilizers, there can be mentioned dilauryl thiodipropionate, distearyl thiodipropionate, aminothioglycolate, 1,1-thiobis(2-naphthol), ditridecyl thiodipropionate and distearyl β,β'-thiodipropionate.

The phosphorus-containing stabilizers are also known, and, as specific examples thereof, there can be mentioned tris(nonylphenyl)phosphite, cyclic neopentanetetraylbis-(octadecylphosphite) and tris(2,4-di-tert.-butylphenyl)-phosphite.

As specific examples of the amine stabilizers, there can be mentioned phenyl-α-naphthylamine, phenyl-β-naphthylamine, aldol-α-naphthylamine, p-isopropoxy-diphenylamine, p-(p-toluenesulfonylamide)diphenylamine, bis(phenylisopropylidene)-4,4'-diphenylamine, N,N'-diphenylethylenediamine, N,N'-diphenylpropylenediamine, octylated diphenylamine, N,N'-diphenyl-p-phenylenediamine and N-isopropyl-N'-phenyl-p-phenylenediamine.

The amount of the antioxidant is usually in the range of 0.01 to 5.0 parts by weight, preferably 0.05 to 2.5 parts by weight, based on 100 parts by weight of the conjugated diene polymer. When the amount of the antioxidant is too small, the effect of the antioxidant is not manifested and the polymer has poor heat-resistance. In contrast, when the antioxidant is too large, the conjugated diene polymer exhibits heat discoloration. The antioxidant may be used alone or as a combination of at least two thereof.

Conjugated Diene Polymers

By the process of the present invention a conjugated diene polymer can be produced efficiently with a high activity. A conjugated diene polymer having a desired molecular weight and a narrow molecular weight distribution can be obtained by carrying out the polymerization at a specific temperature to effect living polymerization, and using acatalyst prepared with aging.

The conjugated diene polymer produced by the process of the present invention may be either a living polymer or a dead polymer. When the polymer is a copolymer, the copolymer may be either a random copolymer or a block copolymer.

The butadiene polymer of the invention is one of the above-mentioned conjugated diene polymers, and a living homopolymer of butadiene or a living copolymer of at least 50% by weight of butadiene with not more than 50% by weight of a monomer copolymerizable therewith, characterized in that the content of butadiene units having a cis-bond in the total butadiene units is at least 50%, the number average molecular weight (Mn) is in the range of 1,000 to 10,000,000, and the butadiene polymer has at least 80%, based on the total molecular chains, of living chains containing a transition metal of group IV of the periodic table at a terminal thereof.

The living polymerizability is evaluated usually based on the following facts: (i) the polymer has a very narrow molecular weight distribution, namely, the polymer is substantially monodisperse, (ii) as the polymer yield is increased with proceeding of polymerization, the number average molecular weight (Mn) is increased in proportion but the molecular weight distribution Mw/Mn is not broadened, (iii) the number average molecular weight (Mn) of polymer can be controlled by the ratio of monomer amount/catalyst amount, (iv) post polymerization (i.e., second polymerization) of the living polymer can be effected, and (v) a terminal of the living polymer can be made functional.

The content of living polymer chain can be evaluated by the above-mentioned facts (i) through (v), and especially by (iv) and (v) with high accuracy.

More specifically, as for the above-mentioned fact (iv), when the living polymer is subjected to second polymerization, the content of living chains can be determined according to the gel permeation chromatography (GPC) curve of the polymer after the second polymerization, namely, by the mol fraction of molecules forming the peak of the polymer having a molecular weight higher than that of the living polymer measured before the second polymerization. For example, if the content of living chains is at least 80%, the mol fraction of the polymer obtained before the second polymerization is smaller than 20%. Thus, the mol fraction of molecules forming the peak of the polymer having a molecular weight higher than that of the living polymer measured before the second polymerization is at least 80%. Note, if by-products with a low molecular weight are produced, the content of living chains as obtained by measurement is lower than the true content of living chains because the presence of polymers having a molecular weight smaller than that of the polymer obtained by the first polymerization.

As for the above-mentioned fact (e), the content of living chains can be determined by the degree of terminal modification as measured when a terminal of a living polymer is modified. For example, when the degree of terminal modification is at least 80%, the content of living chains is at least 80%. The degree of terminal modification can be calculated from the number average molecular weight Mn of a polymer and the concentration of terminal group introduced by terminal modification. The determining procedure of the concentration of a terminal group varies depending upon the particular terminal modifier used. For example, in the case where a terminal of a living polymer of butadiene is modified with carbon monoxide, Mn is measured by GPC and the content of terminal carbonyl group is measured by infrared absorption spectroscopy.

The butadiene polymer of the present invention is a homopolymer of 1,3-butadiene, or a copolymer comprising at least 50%, preferably at least 70%, more preferably at least 80% and especially preferably at least 90%, of recurring units derived from 1,3-butadiene. Most preferably the butadiene polymer is a homopolymer of 1,3-butadiene. When the proportion of 1,3-butadiene units in the copolymer is too small, the benefit of the butadiene polymer of the present invention, attained by the high content of cis-bond units therein, is reduced.

The content of butadiene units having a cis-bond in the total butadiene units is at least 50% by weight, preferably at least 70% by weight, more preferably at least 80% by weight, and especially preferably at least 90% by weight. If the content of cis-bond is too small, the tensile strength is reduced and the properties desired as rubber are lost. By the term "cis-bond" herein used, we mean 1,4-cis-bond.

The number average molecular weight Mn of the butadiene polymer of the present invention is in the range of 1,000 to 10,000,000, preferably 5,000 to 5,000,000, more preferably 10,000 to 2,000,000, and most preferably 20,000 to 1,000,000. If the molecular weight is too small, the physical properties including mechanical strength of polymer are deteriorated. In contrast, if the molecular weight is too large, shaping of polymer becomes difficult.

The ratio of Mw/Mn of the butadiene polymer of the present invention is not particularly limited, but is preferably not larger than 1.9, more preferably not larger than 1.6 and most preferably not larger than 1.4. If the ratio of Mw/Mn is too large, the properties including abrasion resistance of a cured product are deteriorated.

The branched structure of polymer is evaluated by the relationship of the root mean square radius (hereinafter abbreviated to "RMSR") determined by measurement of GPC-multi-angle light scattering (MALLS), with the absolute molecular weight (MW). In this measurement, tetrahydrofuran is used as elute and the measurement is conducted at a temperature of 40±2° C. By the term "branched structure" used herein, we mean polymer structures formed by elementary reactions including shift reaction, other than normal addition reaction, of monomer. It is not meant a branched-chain vinyl structure derived from 1,2-bond. The branched structure of the butadiene polymer of the present invention is not particularly limited, but preferably satisfies the relationship of RMSR (nm) with MW (g/mol), represented by the following inequality (II), provided that c=0.638 and d=2.01.

$$\log(RMSR) > c \times \log(MW) - d \qquad (II)$$

The butadiene polymer of the present invention is substantially free from a branched structure and has a high content of cis-bond units, and includes the following four types of polymers.

Type 1: A homopolymer of butadiene or a copolymer of at least 50% by weight of butadiene with not more than 50% by weight of a monomer copolymerizable therewith, wherein the content of butadiene units having a cis-bond in the total butadiene units is at least 50%, and relationship of Mw with the ratio of Mw/Mn, represented by the following inequality (III) is satisfied, provided that e=0.162 and f=0.682.

$$\log(Mw/Mn) < e \times \log(MW) - f \qquad (III)$$

The relationship of inequality (III) is satisfied preferably provided that e=0.161, more preferably e=0.160 and especially preferably e=0.159, and preferably provided that f=0.684, more preferably f=0.687, and especially preferably f=0.690.

Type 2: A homopolymer of butadiene or a copolymer of at least 50% by weight of butadiene with not more than 50% by weight of a monomer copolymerizable therewith, wherein the content of butadiene units having a cis-bond in the total butadiene units is at least 50%, the ratio (Mw/Mn) of weight average molecular weight (Mw) to number average molecular weight (Mn) is not larger than 1.6, preferably smaller than 1.5 and more preferably not larger than 1.4, and Mn is in the range of 1,000 to 10,000,000.

Type 3: A homopolymer of butadiene or a copolymer of at least 50% by weight of butadiene with not more than 50% by weight of a monomer copolymerizable therewith, wherein the content of butadiene units having a cis-bond in the total butadiene units is at least 50%, the number average molecular weight (Mn) is in the range of 1,000 to 10,000,000, and the inequality (II) showing the relationship between RMSR (nm) and MW (g/mol) is satisfied at c=0.638 and d<2.01. The inequality (II) is satisfied preferably even at d=2.00 and more preferably d=1.99. This butadiene homopolymer or copolymer is characterized as being substantially free from a branched structure and a high-content of cis-bond units.

Type 4: A living butadiene polymer or a dead butadiene polymer obtained by terminating the polymerization reaction of the living butadiene polymer, which is a homopolymer of butadiene or a copolymer of butadiene with a monomer copolymerizable therewith, wherein the content of butadiene units having a cis-bond in the total butadiene units is at least 50%, the number average molecular weight (Mn) is in the range of 1,000 to 10,000,000, and the polymer has at least 80%, based on the total molecular chains, of living chains containing a transition metal of group IV of the periodic table at a terminal of polymer molecule.

Process for Producing Terminal-Modified Conjugated Diene Polymer

The living conjugated diene polymer of the present invention or the living conjugated diene polymer produced by the process of the present invention has living chains containing a transition metal of group IV of the periodic table at a terminal of each polymer molecule. In the process for producing a terminal-modified conjugated diene polymer, the living conjugated diene polymer is contacted with a reagent capable of reacting with the transition metal-bonded terminal of the living polymer to introduce a functional group, i.e., a terminal modifier, whereby a terminal-modified conjugated diene polymer is produced.

As specific examples of the terminal modifier, there can be mentioned molecular oxygen, carbon monoxide, carbon dioxide, carbon disulfide, carbonyl sulfide and sulfur dioxide, and the following compounds.

Molecular halogens such as chlorine, bromine and iodine; and organic halides such as vinylbenzyl chloride;

- hetero-three-membered ring compounds which include epoxy compounds such as ethylene oxide, propylene oxide, cyclohexene oxide, styrene oxide, epoxidized soybean oil and epoxidized natural rubber; thiirane compounds such as thiirane, methylthiirane and phenylthiirane; and ethyleneimine and derivatives thereof such as N-phenylethyleneimine and N-(β-cyanoethyl) ethyleneimine, and propyleneimine;
- ketones which include N-substituted aminoketones such as 4-dimethylaminoacetophenone, 4-diethylaminoacetophenone, 1,3-bis(diphenylamino)-2-proanone, 1,7-bis(methylethylamino)-4-heptanone, 4-dimethylaminobenozophenone, 4-di-t-butylaminobenozophenone, 4-diphenylaminobenozophenone, 4,4'-bis(dimethylamino)benozophenone, 4,4'-bis(diethylamino)benozophenone and 4,4'-bis(diphenylamino)benozophenone; and N-substituted aminothioketones such as those corresponding to the above-recited N-substituted aminoketones;
- aldehyde compounds which include N-substituted benzaldehydes such as 4-dimethylaminobenzaldehydes, 4-diphenylaminobenzaldehydes and 4-divinylaminobenzaldehydes; N-substituted benzthioaldehydes such as those corresponding to the above-recited N-substituted benzaldehydes; ketene compounds such as ethylketene, butylketene, phenylketene and toluylketene; thioketene compounds such as ethylthioketene, butylthioketene, phenylthioketene and toluylthioketene; ester compounds such as ethyl acetate; lactone compounds such as γ-butyrolactone; acid halide compounds such as propionyl chloride, octanoyl chloride, stearoyl chloride, benzoyl chloride, phthaloyl chloride and maleyl chloride; carbodiimide compounds such as N,N'-diphenylcarbodiimide and N,N'-diethylcarbodiimide;
- pyridine compounds which include pyridine compounds having a halogen on a carbon atom adjacent to the nitrogen atom, such as 2-amino-6-chloropyridine, 2,5-dibromopyridine, 4-chloro-2-phenylquinazoline, 2,4,5-tribromoimidazole, 3,6-dichloro-4-methylpyridazine, 3,4,5-trichloropyridazine, 4-amino-6-chloro-2-mercaptopyrimidine, 2-amino-4-chloro-6-methylpyrimidine, 2-amino-4,6-dichloropyrimidine, 6-chloro-2,4-dimethoxypyrimidine, 2-chloropyrimidine, 2,4-dichloro-6-methylpyrimidine, 4,6-dichloro-2-(methylthio)-pyrimidine, 2,4,5,6-tetrachloropyrimidine, 2,4,6-trichloropyrimidine, 2-amino-6-chloropyrazine, 2,6-dichloropyrazine, 2,4-bis(methylthio)-6-chloro-1,3,5-triazine, 2,4,6-trichloro-1,3,5-triazine, 2-bromo-5-nitrothiazole, 2-chlorobenzothiazole and 2-chloro-benzoxazole; pyridyl-substituted ketones such as methyl-2-pyridylketone, methyl-4-pyridylketone, propyl-2-pyridylketone, di-4-pyridylketone, propyl-3-pyridylketone and 2-benzoylpyridine; and vinylpyridines such as 2-vinylpyridine and 4-vinylpyridine;
- amide compounds which include N,N-dimethylformamide, acetamide, N,N-diethylacetamide, aminoacetamide, N,N-dimethyl-N',N'-dimethylaminoacetamide, N,N-dimethylaminoacetamide, N,N-diethylaminoacetamide, N,N-dimethyl-N'-ethylaminoacetamide, acrylamide, N,N-dimethylacrylamide, N,N-dimethylmethacrylamide, nicotinamide, isonicotinamide, picolinamide, N,N-dimethylisonicotinamide, succinamide, phthalamide, N,N,N',N'-tetramethylphthalamide, oxamide, N,N,N',N'-tetramethyloxamide, 2-furancarboxylic acid amide, N,N-dimethyl-2-furancarboxylic acid amide and N-ethyl-N-methyl-quinolinecarboxylic acid amide; N-substituted lactams such as N-methyl-β-propiolactam, N-phenyl-β-propiolactam, N-methyl-2-pyrrolidone, N-phenyl-2-pyrrolidone, N-t-butyl-2-pyrrolidone, N-phenyl-5-methyl-2-pyrrolidone, N-methyl-2-piperidone, N-phenyl-2-piperidone and N-methyl-ε-caprolactam; and N-substituted thiolactams such as those corresponding to the above-recited N-substituted lactams;
- urea compounds which include N-substituted cyclic ureas such as 1,3-diethyl-2-imidazolydinone, 1,3-dimethyl-2-imidazolydinone, 1,1-dipropyl-2-imidazolydinone, 1-methyl-3-ethyl-2-imidazolydinone, 1-methyl-3-propyl-2-imidazolydinone, 1-methyl-3-butyl-2-imidazolydinone, 1-methyl-3-(2-methoxyethyl)-2-imidazolydinone, 1-methyl-3-(2-ethoxyethyl)-2-imidazolydinone and 1,3-di-(2-ethoxyethyl)-2-imidazolydinone; and thiourea compounds which include N-substituted cyclic thioureas such as those corresponding to the above-recited N-substituted cyclic urea compounds;
- imide compounds such as succinimide, N-methylsuccinimide, maleimide, N-methylmaleimide, phthalimide and N-methylphthalimide; carbamic acid compounds isocyanuric acid compounds and derivatives thereof, such as methyl carbamate, N,N-diethylcarbamate, isocyanuric acid and N,N',N'-trimethylisocyanuric acid; and thiocarbonyl compounds such as those corresponding to the above-recited compounds;
- isocyanate compounds such as phenyl isocyanate and butyl ioscyanate; and thioisocyanate compounds such as phenylthioisocyanate;
- silicon compounds having a halogen atom or an alkoxy group such as trimethylchlorosilane, triethylchlorosilane, triphenylchlorosilane, t-butyldimethylchlorosilane and trimethylethoxysilane; germanium compounds having a halogen atom or an alkoxy group such as trimethylgermanium chloride, triethylgermanium chloride, trimethylgermanium bromide and triphenylgermanium chloride; tin compounds having a halogen atom or an alkoxy group such as trimethyltin chloride, trimethyltin bromide, triethyltin chloride, triethyltin bromide, tripropyltin chloride, tri-n-butyltin chloride, triphenyltin chloride and triphenyltin fluoride; and phosphorus compounds having a halogen atom or an alkoxy group such as dimethylchlorophosphine, diethylchlorophosphine, di-t-butylchlorophosphine, dicyclohexylchlorophosphine, diphenylchlorophosphine, diphenylphosphinic chloride, diphenylchlorophosphate and bis(dimethylamino)phosphoryl chloride. Of these, the tin compounds are preferable. Halogenated tin compounds are more preferable.

To give terminal-modified polymers preferred as rubber materials, among the above-recited terminal modifiers, N-substituted amino ketones and corresponding N-substituted amino thioketones, N-substituted lactams and corresponding N-substituted thiolactams, N-substituted cyclic ureas and corresponding N-substituted cyclic thioureas, imide compounds, carbamic acid compounds, isocyanuric acid compounds and derivatives thereof and corresponding thiocarbonyl-containing compounds, isocyanate compounds and thioisocyanate componds, and tin compounds having a halogen atom or an alkoxy group are prefeable. N-substituted amino ketones and corresponding N-substituted amino thioketones, N-substituted lactams and corresponding N-substituted thiolactams, and halogenated tin compounds are more preferable.

To give a terminal-modified polymer suitable as a macromonomer, a reagent having a reactive site capable of bonding to the living polymer molecule, and further having a polymerizable site is used as a terminal modifier. Such a modifier includes, for example, vinylbenzyl chloride.

The amount of terminal modifier used is preferably in the range of 0.1 to 1,000 mols, more preferably 0.2 to 100 mols and especially preferably 0.5 to 10 mols, per mol of the transition metal compound (A).

The procedure by which a living polymer is contacted with a terminal modifier is not particularly limited, but, the terminal modifier is preferably incorporated in the polymerization system after the conversion of monomer exceeds 10%.

The temperature at which terminal modification is carried out is also not particularly limited. When a terminal modifier is incorporated in a polymerization system during progress of polymerization, the terminal modification temperature is the same as the polymerization temperature, and is in the range of −100 to +100° C., preferably −80 to +60° C., more preferably −70 to +40° C., and most preferably −60 to +20° C. The reaction time for terminal modification is usually in the range of 1 minute to 300 minutes.

The termination of terminal modification can be effected by incorporating a reaction stopper into the reaction system when a predetermined degree of terminal modification is reached. The reaction stopper includes, for example, alcohols such as methanol, ethanol, propanol, butanol and isobutanol. The stopper may contain an acid such as hydrochloric acid. By the termination treatment, an unreacted living polymer becomes a dead polymer.

After termination of the terminal modification, the polymer is recovered. The recovering process is not particularly limited. For example, a steam-stripping process and a precipitation method using a poor solvent are employed.

To stabilize the Mooney viscosity of a terminal-modified polymer as exhibited during storage, a Mooney viscosity stabilizer can be added in the course spanning from the immediately after the completion of terminal modification, to the drying step of polymer. The Mooney viscosity stabilizer includes, for example, organic amino compounds such as ethylamine, propylamine, butylamine, hexylamine, octadecylamine, aniline, naphthylamine, benzylamine, diphenylamine, triethylamine, dimethyloctadecylamine, m-phenylenediamine, p-phenylenediamine, N,N'-dimethyl-p-phenylenediamine, N,N'-dioctyl-p-phenylenediamine, N-propyl-N'-phenyl-p-phenylenediamine, N,N,N',N'-tetrabutylethylenediamine, ethyleneimine, cyclohexeneimine, pyrrolidine, piperidine, morpholine, thiomorpholine, pyridine, pyrrole, pyrimidine, triazine, indole, quinoline and purine.

The amount of the Mooney viscosity stabilizer is not particularly limited, but is preferably in the range of 0.1 to 40 mols, more preferably 0.5 to 20 mols and most preferably 1 to 15 mols, as the amount of amino group per mol of a functional group derived from the terminal modifier bonded to polymer. If the amount of the Mooney viscosity modifier is too small, the Mooney viscosity is liable to vary during storage and the polymer sometimes become unsuitable for practical use. In contrast, if the amount thereof is too large, bleeding is liable to occur and the rate of curing at the step of curing becomes large to an uncontrollable extent.

An antioxidant is incorporated into the terminal-modified polymer in the course spanning from the immediately after the completion of terminal modification, to the recovery of polymer. Especially when the polymer is subjected to a treatment accompanied by heat to be thereby heat-aged, an antioxidant is preferably added to the polymer before the heat treatment. The antioxidant may be added either alone or as a mixture of at least two thereof. As specific examples of the antioxidant added to the terminal-modified polymer, there can be mentioned those which are hereinbefore recited as for the antioxidant added to the conjugated diene polymer. The amount of the antioxidant may also be the same as the amount of the antioxidant hereinbefore mentioned as for the conjugated diene polymer.

Terminal-Modified Butadiene Polymer

The terminal-modified butadiene polymer of the present invention is a homopolymer of butadiene or a copolymer of at least 50% by weight of butadiene with not more than 50% by weight of a monomer copolymerizable therewith, and characterized in that the content of butadiene units having a cis bond in the total butadiene units is at least 50%; the number average molecular weight (Mn) is in the range of 1,000 to 10,000,000; the ratio (Mw/Mn) of weight average molecular weight (Mw) to number average molecular weight (Mn) is smaller than 3.0; a relationship represented by the formula:

$$\log(Mw/Mn) < 0.162 \times \log(Mw) - 0.682$$

is satisfied between the weight average molecular weight (Mw) and the ratio (Mw/Mn); and the butadiene polymer has at least 10%, based on the total polymer chains, of polymer chains having a functional group at a terminal thereof. That is, the terminal-modified polymer is a composition comprising terminal-unmodified polymer molecules and terminal-modified polymer molecules, and the proportion (degree of terminal modification) of the terminal-modified polymer molecules to the sum of the terminal-modified polymer molecules and the terminal-unmodified polymer molecules is at least 10%. The process for producing the terminal-modified butadiene polymer may be the same as that described above as for the process for producing the terminal-modified conjugated diene polymer.

The terminal-modified butadiene polymer of the present invention is a homopolymer of butadiene or a copolymer comprising at least 50% by weight, preferably 70% by weight, more preferably at least 80% by weight and especially preferably at least 90% by weight of recurring units derived from 1,3-butadiene. A homopolymer of 1,3-butadiene is most preferable. If the proportion of the butadiene units is too small, the advantage brought about by a large proportion of the cis-bond unit content in the butadiene polymer is lost.

The content of cis-bond units in the 1,3-butadiene units of the terminal-modified butadiene polymer is at least 50%, preferably at least 80% and more preferably at least 90%. If the cis-bond unit content is too small, tensile property and other property are deteriorated and the characteristics desired for rubber are lost. By the term "cis-bond unit content" used herein is meant the content of 1,4-cis-bond units.

The number average molecular weight (Mn) of the terminal-modified butadiene polymer of the present invention as measured by GPC and expressed as that of polybutadiene is in the range of 1,000 to 10,000,000.

This polymer is classified into two types depending upon the use thereof: a high-molecular-weight terminal-modified butadiene polymer desired for rubber material, and a low-molecular-weight butadiene polymer used as a macromonomer or a reactive prepolymer.

The first type of high-molecular weight butadiene polymer used as rubber material has preferably an Mn in the range of 5,000 to 5,000,000, more preferably 10,000 to 2,000,000, and most preferably 20,000 to 1,000,000. If Mn is too small, the mechanical strength and other properties as a high polymer are deteriorated. In contrast, Mn is too large, the polymer is difficult to shape.

The second type of high-molecular weight butadiene polymer used as a macromonomer or a reactive prepolymer has preferably an Mn in the range of 1,000 to 100,000 and more preferably 2,000 to 500,000. If Mn is too large, the reactivity as a macromonomer or a reactive prepolymer is poor. In contrast, Mn is too small, the rubbery modification effect for the polymer is poor.

The terminal-modified butadiene polymer of the present invention has a molecular weight distribution, i.e., a ratio (Mw/Mn) of the weight average molecular weight (Mw) to the number average molecular weight (Mn) is smaller than 3.0, preferably smaller than 2.5, more preferably smaller than 2.0 and most preferably smaller than 1.5. If the molecular weight distribution is too large, abrasion resistance and other properties desired for a crosslinked product are deteriorated. If the above formula (III) is not satisfied between Mw and Mw/Mn, the properties desired for a cross-linked product are deteriorated.

When the terminal-modified butadiene polymer is produced by the process mentioned above as for the conjugated diene polymer, and the relationship between RMSR and MW are the same as those mentioned above as for the conjugated diene polymer.

The degree of terminal modification of the terminal-modified butadiene polymer is at least 10%, preferably at least 40%, more preferably at least 60% and especially preferably at least 80%. By the above-mentioned process for producing the conjugated diene polymer, a living butadiene polymer having a living molecule chain content of larger than 80% can be obtained easily, and further by terminally modifying the living butadiene polymer, a terminal-modified butadiene polymer containing at least 80% of molecule chains having a functional group bonded to the molecule chain based on the total molecule chains can be produced. If the degree of terminal modification is too small, the mechanical strength and other properties desired for rubber material are insufficient, and the reactivity of macromonomer or prepolymer is poor.

The degree of terminal modification is defined as percentage of the number of terminal-modified polymer molecules to the number of the total polymer molecules, and can be determined by measuring Mn of the polymer and the concentration of terminal-modified group. The Mn is measured by GPC or other means. The measurement of the concentration of the terminal-modified group varies depending upon the particular kind of the terminal modifier, but, methods of infrared absorption spectroscopy, $^1$H-NMR spectroscopy, $^{13}$C-NMR spectroscopy and GPC provided with ultraviolet detector and differential refractometer.

Process for Producing Coupled Conjugated Diene Polymer

The coupled conjugated diene polymer of the present invention can be produced by contacting the living conjugated diene polymer of the present invention or the living conjugated diene polymer produced by the process of the present invention with a reagent capable of reacting with a terminal having a transition metal bonded thereto of the living polymer, i.e., a coupling agent.

In the present invention, by the term "coupled polymer" we mean a polymer produced by allowing a plurality of living polymer molecules to react with one molecule of a coupling agent to thereby form one polymer molecule.

The manner in which a coupled polymer is formed is classified into two types: first type coupling wherein a plurality of living polymer molecules are reacted with one molecule of coupling agent (e.g., tin tetrachloride) having a plurality of functional groups capable of reacting with the transition metal-bonded site of each polymer molecule to form one coupled polymer molecule, and second type wherein one living polymer molecule is allowed to react with one molecule of coupling agent (e.g., N-methylpyrrolidone) to form a terminal-modified polymer, and thereafter two or more of the terminal-modified polymer are subjected to a chemical reaction or an after-treatment such as heat-treatment to form a coupled polymer. It is possible that the two types of coupling occur simultaneously in one reaction system.

As specific examples of the coupling agent, there can be mentioned representative molecular oxygen, carbon monoxide, carbon dioxide, carbon disulfide, carbonyl sulfide and sulfur dioxide, and the following compounds.

Molecular halogens such as chlorine, bromine and iodine; and organic halides such as vinylbenzyl chloride and trimethylene bromide;

hetero-three-membered ring compounds which include epoxy compounds such as ethylene oxide, propylene oxide, cyclohexene oxide, styrene oxide, epoxidized soybean oil, epoxidized natural rubber, bisphenol A diglycidyl ether, glycerin triglycidyl ether and N,N,N', N'-tetraglycidyl-diaminodiphenylmethane; thuirane compounds such as thiurane, methylthurane and phenylthiirane; and ethyleneimine and derivatives thereof such as propyleneimine, N-penylethyleneimine, N-(β-cyanoethyl)ethyleneimine and 2,5-bis(1-aziridinyl)-p-benzoquinone, and propyleneimine;

ketones which include 2,5-hexanedione; N-substituted aminoketones such as 4-dimethylaminoacetophenone, 4-diethylaminoacetophenone, 1,3-bis(diphenylamino)-2-proanone, 1,7-bis(methylethylamino)-4-heptanone, 4-dimethylaminobenozophenone, 4-di-t-butylaminobenozophenone, 4-diphenylaminobenozophenone, 4,4'-bis(dimethylamino)-benozophenone, 4,4'-bis(diethylamino)-benozophenone and 4,4'-bis(diphenylamino)benozophenone; and N-substituted aminothioketones such as those corresponding to the above-recited N-substituted aminoketones;

aldehyde compounds which include pentanedial; N-substituted benzaldehydes such as 4-dimethylaminobenzaldehydes, 4-diphenylaminobenzaldehydes and 4-divinylaminobenzaldehydes; N-substituted benzthioaldehydes such as those corresponding to the above-recited N-substituted benzaldehydes; compounds having a ketene structure such as ethylketene, butylketene, phenylketene and toluylketene; compounds having a thioketene structure such as ethylthioketene, butylthioketene, phenylthioketene and toluylthioketene; compounds having an ester structure such as ethyl acetate, fatty acid glycerol ester, glycerol triacetate and glycerol tributyrate; compounds having a lactone structure such as γ-butyrolactone; compounds having an acid halide structure such as propionyl chloride, benzoyl chloride, phthaloyl chloride, maleyl chloride and trimesoyl chloride; compounds having a carbodiimide structure such as N,N'-diphenylcarbodiimide and N,N'-diethylcarbodiimide;

pyridine compounds which include pyridine compounds having a halogen on a carbon atom adjacent to the nitrogen atom, such as 2-amino-6-chloropyridine, 2,5-dibromopyridine, 4-chloro-2-phenylquinazoline, 2,4,5-tribromoimidazole, 3,6-dichloro-4-methylpyridazine, 3,4,5-trichloropyridazine, 4-amino-6-chloro-2-mercaptopyrimidine, 2-amino-4-chloro-6-methylpyrimidine, 2-amino-4,6-dichloropyrimidine, 6-chloro-2,4-dimethoxypyrimidine, 2-chloropyrimidine, 2,4-dichloro-6-methylpyrimidine, 4,6-dichloro-2-(methylthio)-pyrimidine, 2,4,5,6-tetrachloropyrimidine, 2,4,6-trichloropyrimidine, 2-amino-6-chloropyrazine, 2,6-dichloropyrazine, 2,4-bis(methylthio)-6-chloro-1,3,5-triazine, 2,4,6-trichloro-1,3,5-triazine, 2-bromo-5-nitrothiazole, 2-chlorobenzothiazole and 2-chloro-benzoxazole; pyridyl-substituted ketones such as methyl-2-pyridylketone, methyl-4-pyridylketone, propyl-2-pyridylketone, di-4-pyridylketone, propyl-3-pyridylketone and 2-benzoylpyridine; and vinylpyridines such as 2-vinylpyridine and 4-vinylpyridine;

compounds having an amide structure, which include N,N-dimethylformamide, acetamide, N,N-diethylacetamide, aminoacetamide, N,N-dimethyl-N',N'-dimethylaminoacetamide, N,N-dimethylaminoacetamide, N,N-diethylaminoacetamide, N,N-dimethyl-N'-ethylaminoacetamide, acrylamide, N,N-dimethylacrylamide, N,N-dimethylmethacrylamide, nicotinamide, isonicotinamide, picolinamide, N,N-dimethylisonicotinamide, succinamide, phthalamide, N,N,N',N'-tetramethylphthalamide, oxamide, N,N,N',N'-tetramethyloxamide, 2-furancarboxylic acid amide, N,N-dimethyl-2-furancarboxylic acid amide and N-ethyl-N-methyl-quinolinecarboxylic acid amide; N-substituted lactams such as N-methyl-β-propiolactam, N-phenyl-β-propiolactam, N-methyl-2-pyrrolidone, N-phenyl-2-pyrrolidone, N-t-butyl-2-pyrrolidone, N-phenyl-5-methyl-2-pyrrolidone, N-methyl-2-piperidone, N-phenyl-2-piperidone and N-methyl-ε-caprolactam; and N-substituted thiolactams such as those corresponding to the above-recited N-substituted lactams;

compounds having a urea structure which include urea and polymethylene urea; N-substituted cyclic ureas such as 1,3-diethyl-2-imidazolidinone, 1,3-dimethyl-2-imidazolidinone, 1,1-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone and 1,3-di-(2-ethoxyethyl)-2-imidazolidinone; and compounds having a thiourea structure which include N-substituted cyclic thioureas such as those corresponding to the above-recited N-substituted cyclic ureas;

compounds having an imide structure such as succinimide, N-methylsuccinimide, maleimide, N-methylmaleimide, phthalimide, N-methylphthalimide and polyimide; compounds having a carbamic acid structure, compounds having an isocyanuric acid structure and compounds having a structure derived therefrom, such as methyl carbamate, N,N-diethylcarbamate, isocyanuric acid and N,N',N'-trimethylisocyanuric acid; and thiocarbonyl compounds such as those corresponding to the above-recited compounds;

compounds having an isocyanate structure such as 2,4-tolylene diisocyanate, 2,6-tolylene diisocyanate, diphenylmethane diisocyanate, 1,3,5-benzene triisocyanate and polymeric type diphenylmethane diioscyanate, isophorone diisocyanate and hexamethylene diisocyanate; and compounds having a thioisocyanate structure such as 2,4-tolylene dithioisocyanate and hexamethylene dithioisocyanate;

silicon compounds having a halogen atom or an alkoxy group such as hexachlorodisilane, bis(trichlorosilyl)ethane, silicon tetrachloride, silicon tetrabromide, silicon tetrafluoride, silicon tetraiodide, tetramethoxysilane, tetraethoxysilane, trichloromethylsilane, ethyltrichloro-silane, n-butyltrichlorosilane, phenyltrichlorosilane, vinyltrichlorosilane, methyltrimethoxysilane, phenyltrimethoxysilane, 3-aminopropyltriethoxysilane, dimethyldichlorosilane, diphenyldichlorosilane, methyldichlorosilane, methylphenyldichlorosilane, dimethyldiethoxysilane and diphenyldimethoxysilane;

germanium compounds having a halogen atom or an alkoxy group such as germanium tetrachloride, germanium tetrabromide, germanium tetraiodide, germanium tetraethoxide, ethylgermanium trichloride, germanium diuodide, dimethylgermanium dichloride and diethylgermanium dichloride;

tin compounds having a halogen atom or an alkoxy group such as bis(trichlorostanyl)ethane, tin tetrachloride, tin tetrabromide, tin tetraiodide, tin tetrafluoride, tetra-t-butoxytin, methyltin trichloride, phenyltin trichloride, n-butyltin trichloride, tin dichloride, tin dibromide, tin diodide, tin difluoride, dimethyltin dichloride, di-n-butyltin dichloride, di-t-butyltin dichloride, diphenyltin dichloride, divinyltin dichloride and diethoxytin;

phosphorus compounds having a halogen atom or an alkoxy group such as phosphorus pentachloride, phosphorus pentabromide, phosphorus pentafluoride, bis-(dichlorophosphino)methane, 1,2-bis(dichlorophosphino)-ethane, 1,2-bis(dichlorophosphino)-1,2-dimethylhydrazine, phosphorus trichloride, phosphorus tribromide, phosphorus triiodide, phosphorus trifluoride, thiophosphoryl chloride, methyldichlorophosphine, ethyldichlorophosphine, t-butyldichlorophosphine, phenyldichlorophosphine, phenyldichlorophosphine oxide and dibromotriphenyl-phosphorane.

To provide coupled polymers preferred as rubber material, among the above-recited coupling agents, compounds having a ketone structure, compounds having an ester or lactone structure, compounds having an amido structure, compounds having an isocyanate or thioisocyanate structure, silicon compounds having a halogen atom or an alkoxy group, germanium compounds having a halogen atom or an alkoxy group, tin compounds having a halogen atom or an alkoxy group and phosphorus compounds having a halogen atom or an alkoxy group are preferable. N-substituted lactams, corresponding N-substituted lactams, and tin compounds having a halogen atom or an alkoxy group are especially preferable. Tin tetrachloride is most preferable.

The amount of coupling agent used is preferably in the range of 0.01 to 1,000 mols, more preferably 0.05 to 100 mols and especially preferably 0.1 to 10 mols, per mol of the transition metal compound (A).

The procedure by which a living polymer is contacted with a coupling agent is not particularly limited, but, the coupling agent is usually incorporated in the polymerization system. The incorporation of coupling agent is generally conducted after the conversion of monomer exceeds 10%.

The temperature at which coupling is carried out is also not particularly limited. When a polyfunctional reagent is used as the coupling agent, and it is incorporated in a polymerization system during progress of polymerization, the coupling temperature is the same as the polymerization temperature, and is in the range of −100 to +100° C., preferably −80 to +60° C., more preferably −70 to +40° C., and most preferably −60 to +20° C. The reaction time for coupling is usually in the range of 1 minute to 300 minutes.

The termination of coupling reaction can be effected by incorporating a reaction stopper into the reaction system when a predetermined degree of coupling is reached. The reaction stopper includes, for example, alcohols such as methanol, ethanol, propanol, butanol and isobutanol. The stopper may contain an acid such as hydrochloric acid. By the termination treatment, an unreacted living polymer becomes a dead polymer.

After termination of the coupling reaction, the polymer is recovered. The recovering process is not particularly limited. For example, a steam-stripping process and a precipitation method using a poor solvent are employed. Thereafter, according to the need, a residual solvent is removed, for example, by heat-drying to recover a coupled polymer.

To stabilize the Mooney viscosity of a coupled polymer as exhibited during storage, a Mooney viscosity stabilizer can be added in the course spanning from the immediately after the completion of coupling reaction, to the drying step of polymer. The Mooney viscosity stabilizer includes those which are recited as for the stabilization of a terminal-modified polymer.

The amount of the Mooney viscosity stabilizer is not particularly limited, but is preferably in the range of 0.1 to 40 mols, more preferably 0.5 to 20 mols and most preferably 1 to 15 mols, as the amount of amino group per mol of a functional group of the coupling agent. If the amount of the Mooney viscosity modifier is too small, the Mooney viscosity is liable to vary during storage and the polymer sometimes become unsuitable for practical use. In contrast, if the amount thereof is too large, bleeding is liable to occur and the rate of curing at the step of curing becomes large to an uncontrollable extent.

An antioxidant is incorporated into the coupled polymer in the course spanning from the immediately after the completion of coupling reaction, to the recovery of polymer. Especially when the polymer is subjected to a treatment accompanied by heat to be thereby heat-aged, an antioxidant is preferably added to the polymer before the heat treatment. The antioxidant may be added either alone or as a mixture of at least two thereof. As specific examples of the antioxidant added to the coupled polymer, there can be mentioned those which are hereinbefore recited as for the antioxidant added to the conjugated diene polymer. The amount of the antioxidant may also be the same as the amount of the antioxidant hereinbefore mentioned as for the conjugated diene polymer.

Coupled Polymer

The coupled polymer is obtained as a composition comprising uncoupled polymer molecules and coupled polymer molecules. Sometimes, the composition comprises coupled polymers comprised of different number of bound conjugated diene polymer molecules. The coupled polymer of different number of bound conjugated diene polymer molecules may be classified into two or more polymers having different molecular weights, but usually the composition is used as it is as a coupled polymer.

The coupled butadiene polymer of the present invention is a composition comprising (I) 0 to 90 parts by weight of a polymer which is a homopolymer of butadiene or a copolymer of butadiene with a monomer copolymerizable therewith, in which the content of butadiene units having a cis-bond in the total butadiene units is at least 50%, the number average molecular weight (Mn) is in the range of 1,000 to 10,000,000; and (II) 100 to 10 parts by weight of a polymer composed of at least two molecules of the above-mentioned polymer (I), bonded through a coupling agent. The coupled butadiene polymer can be produced by the above-mentioned process for the production of a conjugated diene polymer.

The coupled butadiene polymer of the present invention is a homopolymer of butadiene or a copolymer comprising at least 50%, preferably at least 70%, more preferably at least 80% and especially preferably at least 90% of recurring units derived from 1,3-butadiene. A homopolymer of 1,3-butadiene is most preferable. If the proportion of the butadiene units is too small, the advantage brought about by a large proportion of the cis-bond unit content in the butadiene polymer is lost.

The content of cis-bond units in the 1,3-butadiene units of the coupled butadiene polymer is at least 50%, preferably at least 80% and more preferably at least 90%. If the cis-bond unit content is too small, tensile property and other property are deteriorated and the characteristics desired for rubber are lost. By the term "cis-bond unit content" used herein is meant the content of 1,4-cis-bond units.

The number average molecular weight (Mn) of polymer (I) in the coupled butadiene polymer composition of the present invention as measured by GPC and expressed as that of polybutadiene is in the range of 1,000 to 10,000,000, preferably 5,000 to 5,000,000, more preferably 10,000 to 1,000,000 and most preferably 20,000 to 500,000. If Mn is too small, the mechanical strength and other properties as a high polymer are deteriorated. In contrast, Mn is too large, the polymer is difficult to shape.

Polymer (I) in the coupled butadiene polymer composition of the present invention has a molecular weight distribution, i.e., a ratio (Mw/Mn) of the weight average molecular weight (Mw) to the number average molecular weight (Mn), of preferably smaller than 3.0, more preferably smaller than 2.0, and most preferably smaller than 1.5. If the molecular weight distribution is too large, abrasion resistance and other properties desired for a crosslinked product are deteriorated.

Polymer (I) in the coupled butadiene polymer composition of the present invention preferably satisfies a relationship of weight average molecular weight (Mw) with the ratio (Mw/Mn) of weight average molecular weight (Mw) to number average molecular weight (Mn), represented by the following inequality ($\gamma$), provided that A=0.162 and B=0.682.

$$\log(Mw/Mn) < A \times \log(MW) - B \quad (\gamma)$$

The relationship of inequality ($\gamma$) is satisfied preferably provided that A=0.161, more preferably A=0.160 and especially preferably A=0.159, and preferably provided that B=0.684, more preferably B=0.687, and especially preferably B=0.690.

Polymer (I) in the coupled butadiene polymer composition of the present invention is preferably substantially free from a branched structure. The branched structure of polymer (I) is evaluated by the relationship of the root mean square radius ("RMSR", in nm) determined by measurement of GPC-multi-angle light scattering (MALLS), with the absolute molecular weight (MW, in g/mol). In this measurement, tetrahydrofuran is used as elute and the measurement is conducted at a temperature of 40±2° C. By the term "branched structure" used herein, we mean polymer structures formed by elementary reactions including shift reaction, other than normal addition reaction, of monomer. It is not meant a branched-chain vinyl structure derived from 1,2-bond, nor a long chain branched structure formed by a coupling reaction. The branched structure of polymer (I) in the coupled butadiene polymer composition of the present invention preferably satisfies a relationship of RMSR (nm) with MW (g/mol), represented by the following inequality ($\delta$).

$$\log(RMSR) > a \times \log(MW) - b \quad (\delta)$$

In inequality ($\delta$), "a" is 0.638, and "b" is 2.01, preferably not larger than 2.00 and more preferably not larger than 1.99. The butadiene polymer satisfying inequality ($\delta$) is formed by a living polymerization, and is substantially free from a branched structure and has a high content of cis-bond units.

The coupled butadiene polymer composition of the present invention comprises a polymer (II) composed of at least two molecules of the above-mentioned polymer (I), bonded through a coupling agent. The content of polymer (II) in the coupled butadiene polymer composition, i.e., degree of coupling, is at least 10%, preferably at least 20% and more preferably at least 30%. The upper limit of the content of polymer (II) is not particularly limited and may be up to 100%. If the content of polymer (II) is too small, improved benefits brought about by coupling including improvement of dimensional stability at room temperature are poor.

The degree of coupling (% by weight) can be calculated from a peak area of a molecule of butadiene polymer (I) and a peak area of a molecule of coupled butadiene polymer (II) in the GPC curve. Note, a molecule of butadiene polymer to which a molecule of coupling agent has not been bound, and a molecule of butadiene polymer to which a molecule of coupling agent has been bound cannot be substantially distinguished from each other by GPC. Therefore, these two types butadiene polymers are regarded as butadiene polymer (I) in the present invention.

The molecular weight of coupled polymer (II) in the coupled butadiene polymer composition of the present invention is at least twice, preferably at least three times, of that of polymer (I).

The molecular shape of coupled butadiene polymer (II) in the coupled butadiene polymer composition of the present invention is straight chain-like when the coupled polymer (II) is composed of two molecules of polymer (I), or is star-shaped when the coupled polymer (II) is composed of at least three molecules of polymer (I). The star-shaped coupled butadiene polymer is more preferred than the straight chain-shaped coupled butadiene polymer.

The chemical structure of the coupled site of coupled butadiene polymer molecule (II) in the coupled butadiene polymer composition of the present invention is not particularly limited, but preferably has a tin-butadienyl bond.

The present invention will now be specifically described by the following working examples.

REFERENCE EXAMPLE 1

Synthesis of (2-Methoxycarbonylmethyl)-cyclopentadienyl-trichlorotitanium [MeO(CO)CH$_2$CpTiCl$_3$]

A solution of 30.6 g (200 mmol) of methyl bromoacetate in 100 ml of tetrahydrofuran (hereinafter abbreviated to "THF") was gradually dropwise added to a solution of 32 g (200 mmol) of trimethylsilylcyclopentadienylsodium in 400 ml of THF while being stirred in an argon atmosphere at −78° C. After completion of the addition, the reaction mixture was further maintained at −78° C. overnight with stirring. Then THF was distilled off under a reduced pressure from the reaction mixture, and the obtained solid was filtered off and subjected to vacuum distillation (65–66° C./3 mmHg) to give about 30 g of (2-methoxycarbonylmethyl)trimethylsilylcyclopentadiene [TMSCpCH$_2$COOMe]. Yield: 70%. The chemical structure was confirmed by the following data obtained by $^1$H-NMR using CDCl$_3$.

$^1$H-NMR (ppm, TMS, CDCl$_3$): 6.55–6.20 (m, ring H bound to C of double bond in Cp), 3.5–3.35 (m, ring H bound to C of single bond in Cp), 3.15–2.98 (m, ring H bound to C of single bond in Cp), 3.69 (s, 2H), 3.67 (s, 3H), −0.22 (s, 9H).

To a solution of 4.2 g (20 mmol) of (2-methoxycarbonylmethyl)trimethylsilylcyclopentadiene in 100 ml of dry methylene chloride, 3.8 g (20 mmol) of titanium tetrachloride was added while being stirred at 0° C. in an argon atmosphere. The mixture was stirred at room temperature for 3 hours. The reaction mixture was cooled to −30° C. to precipitate 4.0 g of orange crystal. Yield: 70%. The chemical structure was confirmed by the following data obtained by $^1$H-NMR using CDCl$_3$.

$^1$H-NMR (ppm, TMS, CDCl$_3$): 7.05 (s, 4H), 3.92 (s, 2H), 3.76 (s, 3H).

REFERENCE EXAMPLE 2

Synthesis of (2-Methoxyethyl)cyclopentadienyl-trichlorotitanium (MeOCH$_2$CH$_2$CpTiCl$_3$)

A solution of 18.9 g (200 mmol) of chloroethyl methyl ether in 100 ml of THF was gradually dropwise added to a solution of 32 g (200 mmol) of trimethylsilyl-cyclopentadienylsodium in 400 ml of THF while being stirred in an argon atmosphere at −78° C. After completion of the addition, the reaction mixture was heated under reflux overnight. Then THF was distilled off under a reduced pressure, and the obtained solid was filtered off and subjected to vacuum distillation (80° C./1 mmHg) to give about 33 g of [(2-methoxy)ethyl]-trimethylsilylcyclopentadiene (TMSCpCH$_2$CH$_2$OMe). Yield: 85%. The chemical structure was confirmed by the following data obtained by $^1$H-NMR using CDCl$_3$.

$^1$H-NMR (ppm, TMS, CDCl$_3$): 6.55–6.20 (m, ring H bound to C of double bond in Cp), 3.5–3.35 (m, ring H bound to C of single bond in Cp), 3.15–2.98 (m, ring H bound to C of single bond in Cp), 3.61 (m, 2H), 3.40 (s, 3H), 3.02 (m, 2H), 0.22 (s, 9H).

To a solution of 0.50 g (2.5 mmol) of the thus-obtained TMSCpCH$_2$CH$_2$OMe in 20 ml of dry methylene chloride, 0.25 ml (2.2 mmol) of titanium tetrachloride was added while being stirred at −78° C. in an argon atmosphere. The mixture was stirred at room temperature for 3 hours. The reaction mixture was cooled to −78° C. to precipitate 0.43 g of orange crystal. Yield: 70%. $^1$H-NMR analysis using CDCl$_3$ revealed that the product was (2-methoxyethyl) cyclopentadienyl-trichlorotitanium (MeOCH$_2$CH$_2$CpTiCl$_3$).

$^1$H-NMR (ppm, TMS, CDCl$_3$): 6.91 (s, 4H), 3.70 (t, 2H), 3.37 (s, 3H), 3.10 (t, 2H)

REFERENCE EXAMPLE 3

Synthesis of Trimethylsilylcyclopentadienyl-trichlorotitanium (Me$_3$SiCpTiCl$_3$)

Bis(trimethylsilyl)cyclopentadiene was synthesized by a method described in J.C.S. Dalton, 1980, p1156, followed by purification by distillation under reduced pressure.

To a solution of 2.1 g (10 mmol) of the thus-produced bis(trimethylsilyl)cyclopentadiene in 100 ml of dry hexane, 1.1 ml (10 mmol) of titanium tetrachloride was dropwise added while being stirred in an argon atmosphere at −78° C. After completion of the addition, the reaction mixture was further stirred for 4 hours. Then solvent was distilled off under a reduced pressure, and the obtained solid was subjected to sublimation to give 2.1 g of yellow crystal. Yield: 85%. The chemical structure of Me$_3$SiCpTiCl$_3$ was confirmed by the following data obtained by $^1$H-NMR using CDCl$_3$.

$^1$H-NMR (ppm, TMS, CDCl$_3$): 6.85 (t, 2H), 6.66 (t, 2H), 0.10 (s, 9H).

EXAMPLE 1

A pressure-resistant glass flask having an inner volume of 300 ml and equipped with a stirrer was charged with 86.6 g of toluene and a solution of 75.0 mmol of methylaluminoxane in toluene (supplied by Tosoh-Akzo Co.), and the content was maintained at a constant temperature of 25° C. A solution of 0.075 mmol of (2-methoxycarbonylmethyl) cyclopentadienyl-trichlorotitanium [MeO(CO)CH$_2$CpTiCl$_3$, hereinafter abbreviated to "TiES"] was added, and the mixture was aged at 25° C. for 5 minutes. Then the content was rapidly cooled to a constant temperature of −25° C. Then 2.35 g of butadiene was charged therein to commence first polymerization while being stirred at −25° C. When 8 minutes elapsed from the commencement of first polymerization, 10 g of the polymerization liquid was sampled to determine the degree of polymerization and conduct GPC analysis. When 10 minutes elapsed from the commencement of first polymerization, 6.13 g of butadiene was added to carried out second polymerization at −25° C. for 100 minutes. An aqueous acidic methanol was added to terminate the polymerization, and the polymerization liquid was poured into a salient amount of an aqueous acidic methanol to precipitate a polymer. The polymer was dissolved in toluene, and the polymer solution was subjected to centrifugal separation to remove the ash content, and then a polymer was reprecipitated from an aqueous acidic methanol. The thus-obtained polymer was dried and weighed to determine yield of the polymer.

The microstructure of polymer was determined by NMR analysis as follows. The ratio of 1,4-bond to 1,2-bond in the polymer was determined by $^1$H-NMR analysis (1,4-bond 5.4–5.6 ppm, 1,2-bond 5.0–5.1 ppm). The ratio of cis-bond to trans-bond was calculated from C-NMR (cis 28 ppm, trans 33 ppm), thus determining the cis-bond content in the total polymer.

The number average molecular weight (Mn) and the molecular weight distribution as expressed by the ratio (Mw/Mn) were determined by gel permeation chromatography (GPC) analysis. For the GPC analysis, two connected columns (GMH supplied by Tosoh Corp.), or column G-7000 connected to column G-5000 was used. The molecular weight was determined from a calibration curve drawn by using a standard polybutadiene specimen (supplied by Polymer Laboratories Co.).

The results of the NMR analysis and the GPC analysis were as follows.

(1) First polymerization; Polymer yield: 100%, Mn: 73,000, Mw/Mn: 1.43
(2) Second polymerization; Polymer yield: 100%, Mn: 463,000, Mw/Mn: 1.09, cis-bond content: 93%, trans-bond content: 2%, 1,2-bond content: 5%.

From GPC eluation curves of polymer, it was confirmed that the peak of polymer obtained in the first polymerization completely disappeared in the GPC curve of polymer obtained in the second polymerization.

It will be seen from the results in Example 1 that butadiene is subject to living polymerization at an extremely high rate (i.e., polymerization activity was very high), the content of living polymer chain is 100%, the cis-bond content is high, the molecular weight is large and the molecular weight distribution is very narrow.

EXAMPLE 2

A solution of 0.0244 mmol of TiES in toluene was dropwise added to a solution of 24.4 mmol of methylaluminoxane in toluene, and the mixture was maintained at 25° C. for 5 minutes to effect aging.

A sealable pressure-resistant glass ampoule having an inner volume of 150 ml was charged with 52.4 g of toluene and 5.5 g of butadiene in a nitrogen atmosphere, and the content was cooled to −25° C. The above-mentioned aged catalyst was added into the ampoule to carry out polymerization at −25° C. for 3 minutes. Thereafter a small amount of an aqueous acidic methanol was added to terminate the polymerization, and the polymerization liquid was poured into a salient amount of an aqueous acidic methanol to precipitate a white solid. The solid was filtered and then dried to give a butadiene polymer.

The yield of polymer was 100%. The polymerization results are shown in Table 1.

The polymerization activity as expressed by the yield of polymer per 1 mmol of transition metal in the transition metal compound used for polymerization and per hour of reaction time was 4,700 g/mmol-M·h.

The branched structure of polymer was determined by GPC-multi-angle light scattering (MALLS) measurement. The GPC-MALLS measurement was conducted at 40±2° C. by using a multi-angle light scattering detector ("DAWN-F" supplied by Wyatt Technology Corporation), two connected columns G-7000 and G-5000 (both supplied by Tosoh Corp.) as column, and THF as eluting liquid. The relationship of the root mean square radius (RMSR, nm) with the absolute molecular weight (MW, g/mol), represented by the inequality (II), was determined in a molecular weight region wherein the measured values were significant. In inequality (II), factors "c" and "d" were 0.655 and 2.08, respectively.

As seen from Table 1, polymerization by the process of the present invention proceeds with high activity, and the obtained polymer has high cis-content, high molecular weight, narrow molecular weight distribution and reduced amount of branched structure.

EXAMPLES 3–10, AND COMPARATIVE EXAMPLE 3

By using TiES as a transition metal compound and employing the conditions shown in Table 2, polymerization and analysis of polymer were carried out by the same methods as described in Example 2. The results are shown in Table 2.

TABLE 2

| Example No. | 3 | 4 | 2 | 5 | 6 | C3* | 7 | 8 | 9 | 10 |
|---|---|---|---|---|---|---|---|---|---|---|
| Catalyst | TiES | TiES | TiES | TiES | TiES | TiES | TiES | TiES | TiES | TiES |
| Aging [Temp. (° C.) × Time (min.)] | +25 × 5 | +25 × 5 | +25 × 5 | +25 × 5 | +25 × 5 | +25 × 5 | −25 × 60 | −25 × 60 | −25 × 60 | −25 × 60 |
| Polymn. Temp. (° C.) | −25 | −25 | −25 | −25 | 0 | +25 | 0 | 0 | −25 | −25 |
| BD/Ti* (g/mmol) | 500 | 500 | 250 | 100 | 250 | 500 | 500 | 500 | 500 | 500 |
| Polymn. time (h) | 0.05 | 0.117 | 0.05 | 0.05 | 0.183 | 0.217 | 0.08 | 0.167 | 0.33 | 0.5 |
| Yield (%) | 37 | 83 | 100 | 100 | 63 | 85 | 28 | 60 | 38 | 57 |
| Polymn. activity | 3,500 | 3,300 | 4,700 | 1,900 | 860 | 980 | 1,600 | 1,600 | 520 | 510 |
| Cis content (%) | 92 | 92 | 92 | 92 | 92 | 92 | 93 | 93 | 93 | 93 |
| $10^{-4}$ Mn | 42 | 69 | 38 | 19 | 61 | 18 | 91 | 106 | 105 | 146 |
| Mw/Mn | 1.13 | 1.36 | 1.21 | 1.17 | 1.15 | 2.58 | 1.41 | 1.67 | 1.37 | 1.51 |

*C3: Comparative Example 3
BD/Ti*: Amount of butadiene monomer (g) per mmol of titanium in catalyst By the term RMSR(100) and RMSR(50) occurring in Table 1 we mean values of RMSR corresponding to molecular weights of 1,000,000 and 500,000, respectively.

COMPARATIVE EXAMPLES 1 AND 2

For comparison, a butadiene polymer ("Neocis 60" supplied by Enichem) prepared by using a commercially available neodymium catalyst, and a butadiene polymer ("Nipol BR1220" supplied by Zeon Corp.) prepared by a commercially available cobalt catalyst were analyzed by the same methods as described in Example 2. The results are shown in Table 1.

TABLE 1

|  | Example 2 | Comparative Example 1 | Comparative Example 2 |
|---|---|---|---|
| Catalyst | TiES | Nd | Co |
| Aging | +25° C., 5 min | — | — |
| Polymn. temp. (° C.) | −25 | — | — |
| BD/Ti*1 (g/mmol) | 250 | — | — |
| Polymn. time (h) | 0.05 | — | — |
| Yield (%) | 100 | — | — |
| Polymn. activity | 4,700 | — | — |
| Cis content (%) | 92 | 97 | 98 |
| $10^{-4}$ Mn | 37.8 | 15.5 | 13.5 |
| Mw/Mn | 1.21 | 3.52 | 2.31 |
| a | 0.655 | 0.638 | 0.523 |
| b | 2.08 | 2.01 | 1.40 |
| RMSR(100) | 70.8 | 65.8 | 54.7 |
| RMSR(50) | 45.0 | 42.3 | 38.1 |

*BD/Ti: Amount of butadiene (g) per mmol of titanium in catalyst

As seen from Table 2, at a polymerization temperature of −25° C. and 0° C., the number average molecular weight increases with an increase of the yield of polymer and a narrow molecular weight distribution is maintained. The number average molecular weight is controlled by the ratio of monomer/catalyst. Further, in Examples 3, 5 and 6, high-cis and substantially monodisperse butadiene polymers are obtained. From these factual data, it was confirmed that polymers obtained in Example 2 and Examples 3 to 10 contain at least 80% of living polymer chains.

EXAMPLES 11–16, AND COMPARATIVE EXAMPLES 4–6

By using (2-methoxyethyl)cyclopentadienyl-trichlorotitanium $MeOCH_2CH_2CpTiCl_3$ (hereinafter abbreviated to "TiET") as a transition metal compound and employing the conditions shown in Table 3, polymerization and analysis of polymer were carried out by the same methods as described in Example 2. The results are shown in Table 3.

As seen from Table 3, the number average molecular weight increases with an increase of the yield at a polymerization temperature of −25° C. and 0° C., but does not increase at a polymerization temperature of 25° C. Thus, it was confirmed that a living polymerization proceeded place in Examples 11 to 16.

TABLE 3

| Example No. | 11 | 12 | 13 | 14 | 15 | 16 | C4* | C5* | C6* |
|---|---|---|---|---|---|---|---|---|---|
| Catalyst | TiET | TiET | TiET | TiET | TiET | TiET | TiET | TiET | TiET |
| Aging [Temp. (° C.) × Time (h)] | −25 × 2 | −25 × 2 | −25 × 2 | −25 × 2 | −25 × 2 | −25 × 2 | −25 × 2 | −25 × 2 | −25 × 2 |
| Polymn. temp. (° C.) | 0 | 0 | 0 | −25 | −25 | −25 | +25 | +25 | +25 |
| BD/Ti* (g/mmol) | 250 | 250 | 250 | 500 | 500 | 500 | 250 | 250 | 250 |
| Polymn. time (h) | 2 | 20 | 100 | 2 | 20 | 100 | 2 | 4 | 20 |
| Yield (%) | 16 | 32 | 43 | 5 | 12 | 32 | 42 | 58 | 81 |
| Polymn. activity | 18 | 3.6 | 0.97 | 11 | 2.7 | 1.4 | 47 | 33 | 9.1 |
| Cis content (%) | 96 | 96 | 96 | 98 | 98 | 98 | 96 | 96 | 96 |
| $10^{-4}$ Mn | 59 | 86 | 108 | 51 | 123 | 194 | 30 | 34 | 33 |
| Mw/Mn | 2.03 | 2.38 | 2.19 | 1.63 | 1.86 | 1.62 | 1.98 | 1.86 | 2.03 |

*C4, C5 and C6: Comparative Examples 4, 5 and 6
BD/Ti*: Amount of butadiene monomer (g) per mmol of titanium in catalyst

EXAMPLES 17 AND 18, AND COMPARATIVE EXAMPLE 7

By using trimethylsilylcyclopentadienyl-trichlorotitanium (hereinafter abbreviated to "TiTMS") as a transition metal compound and employing the conditions shown in Table 4, polymerization and analysis of polymer were carried out by the same methods as described in Example 2. The results are shown in Table 4.

TABLE 4

| Example No. | 17 | 18 | C7* |
|---|---|---|---|
| Catalyst | TiTMS | TiTMS | TiTMS |
| Aging [Temp. (° C.) × Time (min.)] | +25 × 5 | +25 × 5 | +25 × 5 |
| Polymn. Temp. (° C.) | −25 | −25 | 25 |
| BD/Ti* (g/mmol) | 250 | 100 | 250 |
| Polymn. time (h) | 1 | 1 | 0.25 |
| Yield (%) | 61 | 94 | 100 |
| Polymn. activity | 150 | 94 | 1,000 |
| Cis Content (%) | 89 | 89 | 89 |
| $1 \text{ CT}^{-4}$ Mn | 44 | 24 | 35 |
| Mw/Mn | 1.10 | 1.12 | 2.15 |

*C7: Comparative Example 7
BD/Ti: Amount of butadiene (g) per mmol of titanium in catalyst As seen from Table 4, a substantially monodisperse polymer having a narrow molecular weight distribution is obtained at a polymerization temperature of −25° C., whereas a polymer having a relatively broad molecular weight distribution is obtained at a polymerization temperature of 25° C. Thus, it was confirmed that a living polymerization proceeded in Examples 17 and 18.

EXAMPLES 19 AND 20

By using TiTMS as a transition metal compound, triphenylcarboniumtetra(pentafluorophenyl)borate as catalyst ingredient (B), and triisobutylaluminum (hereinafter abbreviated to "TIBA") as third catalyst ingredient, polymerization and analysis of polymer were carried out by the same methods as described in Example 17. The polymerization conditions employed and the results obtained are shown in Table 5.

TABLE 5

| Example No. | 19 | 20 |
|---|---|---|
| Catalyst | TiTMS | TiTMS |
| Aging [Temp. (° C.) × Time (min.)] | −40 × 30 | −40 × 30 |

TABLE 5-continued

| Example No. | 19 | 20 |
|---|---|---|
| Polymn. Temp. (° C.) | −40 | −40 |
| BD/Ti* (mmol/mmol) | 100 | 100 |
| B/Ti* (mmol/mmol) | 1 | 1 |
| Al/Ti* (g/mmol) | 10 | 10 |
| Polymn. time (h) | 2 | 6 |
| Yield (%) | 10 | 20 |
| Polymn. activity | 5 | 3.3 |
| Cis content (%) | 93 | 93 |
| $10^{-4}$ Mn | 4.8 | 9.7 |
| Mw/Mn | 1.07 | 1.11 |

*BD/Ti: Amount of butadiene (g) per mmol of titanium in catalyst
B/Ti: Amount of catalyst ingredient (B) (mmol) per mmol of titanium in catalyst
Al/Ti: Amount of aluminum (mmol) in TIBA per mmol of titanium in catalyst As seen from Table 5, Mn increases with an increase of the yield and the polymer obtained is substantially monodisperse. Thus, it was confirmed that a living polymerization proceeded in Examples 18 and 19.

EXAMPLES 21 AND 22

By using cyclopentadienyltrichlorotitanium (hereinafter abbreviated to "CpTiCl$_3$") as a transition metal compound, polymerization and analysis of polymer were carried out by the same methods as described in Example 2. As CpTiCl$_3$, that was purified by recrystallization from methylene chloride at −35° C. was used. The polymerization conditions and results are shown in Table 6.

TABLE 6

| Example No. | 21 | 22 |
|---|---|---|
| Catalyst | CpTiCl$_3$ | CpTiCl$_3$ |
| Aging [Temp. (° C.) × Time (min.)] | +25 × 5 | +25 × 5 |
| Polymn. Temp. (° C.) | −25 | −25 |
| BD/Ti* (g/mmol) | 250 | 100 |
| Polymn. time (h) | 24 | 24 |
| Yield (%) | 64 | 85 |
| Polymn. activity | 7 | 4 |
| Cis content (%) | 84 | 84 |
| $10^{-4}$ Mn | 48 | 29 |
| Mw/Mn | 1.09 | 1.07 |

*BD/Ti: Amount of butadiene (g) per mmol of titanium in catalyst

As seen from Table 6, a substantially monodisperse polymer having a narrow molecular weight distribution is obtained at −25° C. Thus, it was confirmed that a living polymerization proceeded in Examples 21 and 22.

EXAMPLES 23 AND 25, AND COMPARATIVE EXAMPLE 8

By using CpTiCl$_3$ as a transition metal compound, triphenylcarboniumtetra (pentafluorophenyl)borate as catalyst ingredient (B), and TIBA as third catalyst ingredient, polymerization and analysis of polymer were carried out by the same methods as described in Example 21. The polymerization conditions employed and the results obtained are shown in Table 7.

As seen from Table 7, Mn increases with an increase of the yield and a substantially monodisperse polymer having a narrow molecular weight distribution is obtained at a polymerization temperature of −25° C. In contrast, a polymer having many peaks in the molecular weight distribution curves is obtained at a polymerization temperature of 25° C. Thus, it was confirmed that a living polymerization proceeded in Examples 23 to 25.

TABLE 7

| Example No. | 23 | 24 | 25 | C8 |
|---|---|---|---|---|
| Catalyst | CpTiCl$_3$ | CpTiCl$_3$ | CpTiCl$_3$ | CpTiCl$_3$ |
| Aging [Temp. (° C.) × Time (min.)] | −25 × 20 | −25 × 20 | −25 × 20 | +25 × 20 |
| Polymn. Temp. (° C.) | −25 | −25 | −25 | +25 |
| BD/Ti* (g/mmol) | 100 | 100 | 100 | 40 |
| B/Ti* (mmol/mmol) | 1 | 1 | 1 | 1 |
| Al/Ti* (mmol/mmol) | 10 | 10 | 10 | 10 |
| Polymn. time (h) | 1 | 3 | 5 | 1 |
| Yield (%) | 22 | 35 | 43 | 100 |
| Polymn. activity | 22 | 12 | 9 | 40 |
| Cis content (%) | 89 | 89 | 89 | |
| 10$^{-4}$ Mn | 5.0 | 8.7 | 11.7 | — |
| Mw/Mn | 1.11 | 1.09 | 1.11 | multi-modal |

*C8: Comparative Example 8
BD/Ti: Amount of butadiene (g) per mmol of titanium in catalyst
B/Ti: Amount of catalyst ingredient (B) (mmol) per mmol of titanium in catalyst
Al/Ti: Amount of aluminum (mmol) in TIBA per mmol of titanium in catalyst

EXAMPLE 26

A solution of 0.0122 mmol of TiET in toluene was dropwise added to a solution of 12.2 mmol of methylaluminoxane in toluene (supplied by Tosoh-Akzo Co.), and the mixture was maintained at −25° C. for one hour to effect aging.

A sealable pressure-resistant glass ampoule having an inner volume of 150 ml was charged with 52.4 g of toluene and 5.5 g of butadiene in a nitrogen atmosphere, and the content was maintained at 25° C. The above-mentioned aged catalyst was added into the ampoule to carry out polymerization at +25° C. for 4 hours. Thereafter a small amount of an aqueous acidic methanol was added to terminate the polymerization, and the polymerization liquid was poured into a salient amount of an aqueous acidic methanol to precipitate a white solid. The solid was filtered and then dried to give a butadiene polymer. The yield of polymer was 36%.

The polymerization activity was 41 g/mmol-M·h, the cis-bond content was 97%, Mn was 350,000 and Mw/Mn was 1.92.

The initiator efficiency (E.I.) was 53% as expressed by the following formula X, i.e., the ratio of theoretical molecular weight (Mk) to Mn as determined by GPC measurement.

$$E.I. = Mk/Mn \qquad (X)$$

wherein Mk is calculated from the following formula (Y):

$$Mk = (\text{yield of polymer, weight \%}) \times (\text{amount of butadiene used for polymerization, g})/(\text{amount of Ti in catalyst, mol}) \qquad (Y)$$

The polymerization conditions and results are shown in Table 8.

EXAMPLE 27

Polymerization of butadiene and analysis of polymer were carried out by the same methods as described in Example 26 except that the polymerization time was changed to 20 hours. The results are shown in Table 8.

COMPARATIVE EXAMPLE 9

A sealable pressure-resistant glass ampoule having an inner volume of 150 ml was charged with 52.4 g of toluene and 5.5 g of butadiene in a nitrogen atmosphere, and the content was maintained at +25° C. Into this glass ampoule, a solution of 12.2 mmol of methylaluminoxane in toluene (supplied by Tosoh-Akzo Co.) and a solution of 0.0122 mmol of TiET in toluene were added in this order to carried out polymerization at +25° C. for 4 hours. After-treatments and analysis of polymer were carried out by the same procedures as described in Example 26.

The results are shown in Table 8.

COMPARATIVE EXAMPLE 10

Polymerization of butadiene and analysis of polymer were carried out by the same methods as described in Comparative Example 9 except that the polymerization time was changed to 20 hours. The results are shown in Table 8.

EXAMPLE 28

A solution of 0.0122 mmol of TiET in toluene was dropwise added to a solution of 12.2 mmol of methylaluminoxane in toluene (supplied by Tosoh-Akzo Co.), and the mixture was maintained at +25° C. for one hour to effect aging. Using the thus-aged catalyst, polymerization of butadiene was carried out by the same procedures as described in Example 26 except that the polymerization time was changed to 19 hours. The results are shown in Table 8.

COMPARATIVE EXAMPLE 11

A solution of 0.0122 mmol of TiET in toluene was dropwise added to a solution of 12.2 mmol of methylaluminoxane in toluene (supplied by Tosoh-Akzo Co.), and the mixture was maintained at +25° C. for 24 hours to effect aging. Using the thus-aged catalyst, polymerization of butadiene was carried out by the same procedures as described in Example 26 except that the polymerization time was changed to 21 hours. The results are shown in Table 8.

COMPARATIVE EXAMPLE 12

A sealable pressure-resistant glass ampoule having an inner volume of 150 ml was charged with 52.4 g of toluene and 5.5 g of butadiene in a nitrogen atmosphere, and the content was maintained at +25° C. Into this glass ampoule, a solution of 12.2 mmol of methylaluminoxane in toluene (supplied by Tosoh-Akzo Co.) and a solution of 0.0122 mmol of TiET in toluene were added in this order to carried out polymerization at +25° C. for 19 hours. The results are shown in Table 8.

TABLE 8

| Example No. | 26 | 27 | C9 | C10* | 28 | C11* | C12* |
|---|---|---|---|---|---|---|---|
| Catalyst | TiET | TiET | TiET | TiET | TiET | TiET | TiET |
| Aging [Temp. (° C.) × Time (h)] | −25 × 1 | −25 × 1 | — | — | +25 × 1 | +25 × 24 | — |
| Function (h) | 1,000 | 1,000 | — | — | 10 | 10 | — |
| Polymn. temp. (° C.) | +25 | +25 | +25 | +25 | +25 | +25 | +25 |
| BD/Ti*1 (g/mmol) | 500 | 500 | 500 | 500 | 500 | 500 | 500 |
| Polymn. time (h) | 4 | 20 | 4 | 20 | 19 | 21 | 19 |
| Yield (%) | 37 | 60 | 12 | 22 | 39 | ~0 | 18 |
| Polymn. activity | 41 | 14 | 14 | 5 | 9 | ~0 | 4 |
| Cis content (%) | 97 | 97 | 96 | 96 | 96 | — | 96 |
| $10^{-4}$ Mn | 35 | 38 | 36 | 38 | 59 | — | 49 |
| E.I. (%) | 53 | 79 | 17 | 30 | 33 | ~0 | 18 |
| Mw/Mn | 1.92 | 2.13 | 2.04 | 2.36 | 2.01 | — | 2.25 |

*C10, C11 and C12: Comparative Examples 10, 11 and 12
Function: Value for 6000 exp (−0.0921T)
BD/Ti*: Amount of butadiene monomer (g) per mmol of titanium in catalyst

EXAMPLE 29 AND COMPARATIVE EXAMPLES 13–15

Using TiES as a transition metal compound, polymerization of butadiene was carried out under the conditions shown in Table 9 by the same procedures as described in Example 26. The results are shown in Table 9. E.I. of polymers obtained in Examples 7 and 9 is also shown in Table 9.

TABLE 9

| Example No. | 29 | 7 | 9 | C13* | C14* | C15* |
|---|---|---|---|---|---|---|
| Catalyst | TiES | TiES | TiES | TiES | TiES | TiES |
| Aging [Temp. (° C.) × Time (h)] | −25 × 1 | −25 × 1 | −25 × 1 | — | — | — |
| Function* (h) | 1,000 | 1,000 | 1,000 | — | — | — |
| Polymn. Temp. (° C.) | +25 | 0 | −25 | +25 | 0 | −25 |
| BD/Ti* (g/mmol) | 500 | 500 | 500 | 500 | 500 | 500 |
| Polymn. time (h) | 1.5 | 0.08 | 0.33 | 17 | 7 | 7 |
| Yield (%) | 75 | 28 | 38 | 61 | ~0 | ~0 |
| Polymn. activity | 230 | 1,600 | 520 | 16 | ~0 | ~0 |
| Cis content (%) | 92 | 93 | 93 | 87 | — | — |
| $10^{-4}$ Mn | 129 | 91 | 105 | 81 | — | — |
| E.I. (%) | 29 | 15 | 18 | 43 | ~0 | ~0 |
| Mw/Mn | 1.91 | 1.41 | 1.37 | 2.21 | — | — |

*C13, C14 and C15: Comparative Examples 13, 14 and 15
Function: Value for 6000 exp (−0.0921 T)
BD/Ti: Amount of butadiene (g) per mmol of titanium in catalyst

EXAMPLE 30 AND COMPARATIVE EXAMPLES 16

Using TiES as a transition metal compound, polymerization of butadiene was carried out under the conditions shown in Table 10 by the same procedures as described in Example 26. The results are shown in Table 10. E.I. of polymers obtained in Examples 3 and 5 is also shown in Table 10.

TABLE 10

| Example No. | 30 | 3 | 2 | 5 | C16* |
|---|---|---|---|---|---|
| Catalyst | TiES | TiES | TiES | TiES | TiES |
| Aging [Temp. (° C.) × Time (min or h)] | +25 × 5 m | +25 × 5 m | +25 × 5 m | +25 × 5 m | +25 × 18 h |
| Function* (h) | 10 | 10 | 10 | 10 | 10 |
| Polymn. Temp. (° C.) | +25 | −25 | −25 | −25 | −25 |
| BD/Ti* (g/mmol) | 500 | 500 | 250 | 100 | 500 |
| Polymn. time (h) | 1.0 | 0.05 | 0.05 | 0.05 | 7.0 |
| Yield (%) | 100 | 37 | 100 | 100 | 0 |
| Polymn. activity | 450 | 3,500 | 4,700 | 1,900 | 0 |
| Cis content (%) | 92 | 92 | 92 | 92 | — |
| $10^{-4}$ Mn | 54 | 42 | 38 | 19 | — |
| E.I. (%) | 93 | 44 | 66 | 54 | 0 |
| Mw/Mn | 3.07 | 1.13 | 1.21 | 1.17 | — |

*C16: Comparative Example 16
Function: Value for 6000 exp (−0.0921 T)
BD/Ti: Amount of butadiene (g) per mmol of titanium in catalyst

EXAMPLES 31–40

A sealable pressure-resistant glass ampoule having an inner volume of 150 ml was charged with 26.0 g of toluene and a solution of 6.7 mmol of methylaluminoxane in toluene (supplied by Tosoh-Akzo Co.). The ampoule was maintained at an aging temperature shown in Tables 11 and 12, and a solution of 0.0067 mmol of TiES in toluene was dropwise added into the ampoule, and the content was maintained for an aging time shown in Tables 11 and 12. Then the content was cooled to −25° C., and a solution of 2.0 g of butadiene in 6.0 of toluene was added to carry out polymerization at that temperature for 30 minutes. Thereafter after-treatments were carried out by the same procedures as described in Example 26. The results are shown in Tables 11 and 12.

TABLE 11

| Example No. | 31 | 32 | 33 | 34 | 35 |
|---|---|---|---|---|---|
| Catalyst | TiES | TiES | TiES | TiES | TiES |
| Aging [Temp. (° C.) × Time (min)] | +50 × 1 | +50 × 20 | +25 × 1 | +25 × 20 | +25 × 60 |
| Function* (h) | 1 | 1 | 10 | 10 | 10 |
| Polymn. Temp. (° C.) | −25 | −25 | −25 | −25 | −25 |
| BD/Ti* (g/mmol) | 300 | 300 | 300 | 300 | 300 |
| Polymn. time (h) | 0.5 | 0.5 | 0.5 | 0.5 | 0.5 |
| Yield (%) | 81 | 50 | 98 | 93 | 80 |
| Polymn. activity | 480 | 300 | 590 | 560 | 480 |
| Cis content (%) | 92 | 92 | 92 | 92 | 92 |
| $10^{-4}$ Mn | 79 | 147 | 42 | 48 | 64 |
| E.I. (%) | 31 | 10 | 70 | 59 | 38 |
| Mw/Mn | 1.49 | 1.5 | 1.76 | 1.47 | 1.48 |

TABLE 12

| Example No. | 36 | 37 | 38 | 39 | 40 |
|---|---|---|---|---|---|
| Catalyst | TiES | TiES | TiES | TiES | TiES |
| Aging [Temp. (° C.) × Time (min or h)] | +25 × 3 h | 0 × 10 m | 0 × 3 h | −25 × 10 m | −25 × 5 h |
| Function* (h) | 10 | 100 | 100 | 1,000 | 1,000 |
| Polymn. Temp. (° C.) | −25 | −25 | −25 | −25 | −25 |
| BD/Ti* (g/mmol) | 300 | 300 | 300 | 300 | 300 |
| Polymn. time (h) | 0.5 | 0.5 | 0.5 | 0.5 | 0.5 |
| Yield (%) | 11 | 88 | 81 | 51 | 87 |
| Polymn. activity | 66 | 530 | 480 | 300 | 300 |
| Cis content (%) | 92 | 92 | 92 | 92 | 92 |
| $10^{-4}$ Mn | 89 | 50 | 32 | 71 | 45 |
| E.I. (%) | 4 | 53 | 77 | 21 | 59 |
| Mw/Mn | 1.70 | 1.45 | 1.65 | 1.40 | 1.31 |

*Function: Value for 6000 exp (−0.0921 T)
BD/Ti: Amount of butadiene (g) per mmol of titanium in catalyst

EXAMPLES 41 AND 42

Using TiTMS as transition metal compound, polymerization of butadiene was carried out by the same procedures as described in Example 26. The polymerization conditions and results are shown in Table 13.

COMPARATIVE EXAMPLE 17 AND EXAMPLE 43

Using TiTMS as transition metal compound, polymerization of butadiene was carried out by the same procedures as described in Comparative Example 9. The polymerization conditions and results are shown in Table 13.

TABLE 13

| Example No. | 41 | C17* | 42 | 43 |
|---|---|---|---|---|
| Catalyst | TiTMS | TiTMS | TiTMS | TiTMS |
| Aging [Temp. (° C.) × Time (min)] | +25 × 5 | — | +25 × 5 | — |
| Function* (h) | 10 | — | 10 | — |
| Polymn. Temp. (° C.) | +25 | +25 | −25 | −25 |
| BD/Ti* (g/mmol) | 100 | 100 | 100 | 100 |
| Polymn. time (min or h) | 15 m | 25 m | 1 h | 1 h |
| Yield (%) | 97 | 85 | 94 | 34 |
| Polymn. activity | 390 | 200 | 94 | 34 |
| Cis content (%) | 88 | 88 | 92 | 92 |
| $10^{-4}$ Mn | 13 | 27 | 24 | 42 |
| E.I. (%) | 73 | 31 | 40 | 8 |
| Mw/Mn | 1.82 | 1.81 | 1.12 | 1.14 |

*C17: Comparative Example 17
Function: Value for 6000 exp (−0.0921 T)
BD/Ti: Amount of butadiene (g) per mmol of titanium in catalyst

COMPARATIVE EXAMPLE 18

A sealable pressure-resistant glass ampoule having an inner volume of 150 ml was charged with 49 g of toluene and 1.0 g of butadiene in a nitrogen atmosphere, and the content was maintained at a constant temperature of 50° C. Then a solution of 0.02 mmol of n-butyllithium in hexane was added to carry out polymerization at 50° C. for 120 minutes. To this polymerization solution, a solution of 0.1 mmol of 4,4'-bisdiethylaminobenzophenone (hereinafter abbreviated to "EAB") in toluene was added, and the mixture was maintained at 50° C. for 6 hours to effect a terminal modification reaction. Then a small amount of an aqueous acidic methanol was added to terminate the terminal modification reaction, and the polymerization liquid was poured into a salient amount of an aqueous acidic methanol containing an antioxidant to precipitate a polymer. The polymer was dried and weighted to determine the yield of polymer. The yield and results of the following analysis of polymer are shown in Table 14.

The microstructure of the polymer was determined by NMR analysis in a manner similar to that in the preceding working examples. GPC analysis was conducted by using an ultraviolet absorption detector (UV, detecting wavelength 310 nm) and a differential refractometer (RI) as detector, two connected columns GMH, or connected G-7000 and G-5000 (both supplied by Tosoh Corp.) as column, and THF as eluting liquid. The number average molecular weight (Mn) and the molecular weight distribution (Mw/Mn) were determined according to a calibration curve drawn by using standard polybutadiene (supplied by Polymer Laboratories Co.). The degree of terminal modification was determined by the following formula:

$$(UV \text{ peak intensity}/RI \text{ peak intensity}) \times 10^{-4} \, Mn$$

COMPARATIVE EXAMPLE 19

By the method described in Example 1 of WO 95/04090, butadiene was polymerized at 60° C. in cyclohexane by using neodymium octenate/dibuthylaluminum hydride/tributylphosphine/diethylaluminum chloride as polymerization catalyst, and then the polymerization solution was treated with EAB to effect terminal modification reaction at 60° C. for 70 minutes. The thus-obtained polymer was recovered and analyzed by the same procedures as employed in Comparative Example 18. The results are shown in Table 14. The molecular weight distribution Mw/Mn of the polymer as determined by GPC-MALLS method was 2.3.

EXAMPLE 44

A solution of 0.05 mmol of TiES in toluene was dropwise added to a solution of 50 mmol of methylaluminoxane, and the mixture was maintained at 25° C. for 5 minutes to effect aging.

A sealable pressure-resistant glass ampoule having an inner volume of 150 ml was charged with 49 g of toluene and 1.0 g of butadiene in a nitrogen atmosphere, and the content was cooled to −25° C. The above-mentioned aged catalyst was added into the ampoule to carry out polymerization at −25° C. for 5 minutes. Then a solution of 5 mmol of EAB in toluene was added to the polymer solution and, while the temperature of the polymer solution was allowed to naturally rise to room temperature, a terminal modification reaction was carried out for 60 minutes. Thereafter an aqueous acidic methanol was added to terminate the terminal modification reaction, and the polymerization solution was poured into a salient amount of an aqueous acidic methanol containing an antioxidant to precipitate a polymer. The polymer was dissolved in toluene, and the polymer solution was subjected to centrifugal separation to remove the ash content, and then a polymer was reprecipitated from an aqueous acidic methanol. The thus-obtained polymer was dried and weighed to determine yield of the polymer.

The polymer was analyzed by the same procedures as employed in Comparative Example 18. The results are shown in Table 14. As seen from Table 14, the butadiene polymer had a high cis-bond content, a narrow molecular weight distribution and a terminal modification degree of 86%. This polymer was obtained with an improved efficiency.

EXAMPLE 45

By the same procedures as employed in Example 44, polymerization of butadiene, terminal modification, recovery and analysis of polymer were carried out except that amount of methylaluminoxane was changed to 100 mmol, amount of TiES was changed to 0.1 mmol, and 100 mmol of phenyl isocyanate as terminal modifier was used. Low molecular weight impurities such as unreacted phenyl isocyanate were completely removed by GPC from the thus-obtained polymer, and thereafter the polymer was subjected to $^1$H-NMR analysis under the following conditions. Solvent: heavy methylene chloride, internal standard: tetramethylsilane, temperature: 30° C., pulse delay: 3.362 seconds, integrated number: 11,526. From signal intensity of unsaturated proton derived from butadiene units and siganal intensity of phenyl proton, which occur in the $^1$H-NMR spectrum, the molar ratio of butadiene unit to phenyl group was calculated as 695/1. The number average molecular weight (Mn) of polymer as determined by GPC measurement was 38,600. Thus, the terminal modification degree of polymer was calculated as 100%. The results of analysis are shown in Table 14.

TABLE 14

| Example No. | 44 | 45 | C18* | C19* |
| --- | --- | --- | --- | --- |
| Catalyst | TiES | TiES | n-BuLi* | Nd* |
| Aging [Temp. (° C.) × Time (min)] | +25 × 5 | +25 × 5 | — | — |
| BD/Ti* (g/mmol) | 20 | 10 | — | — |
| BD/Li* (g/mmol) | — | — | 50 | — |
| Polymn. temp. (° C.) | −25 | −25 | +50 | +60 |
| Polymn. time (min or h) | 5 m | 5 m | 2 h | 30 m |
| Yield (%) | 100 | 100 | 100 | 41 |
| Cis content (%) | 93 | 93 | 35 | 97 |
| $10^{-4}$ Mn | 7.8 | 3.9 | 6.4 | 6.0 |
| Mw/Mn | 1.21 | 1.35 | 1.11 | 3.1 |
| UV/RI | 0.65 | | 0.92 | 0.73 |
| $10^{-4}$ Mn × UV/RI | 5.07 | | 5.89 | 4.36 |
| Term. mod. deg. (%)* | 86 | 100 | 100 | 74 |

*C18 and C19: Comparative Examples 18 and 19
n-BuLi: n-butyllithium catalyst
Nd: neodymium-containing catalyst
BD/Ti: Amount of butadiene (g) per mmol of titanium in catalyst
BD/Li: Amount of butadiene (g) per mmol of lithium in catalyst Butadiene polymer obtained by polymerization at −25° C. using TiES catalyst in Example 2 was regarded as being substantially free from branched structure. Thus, polymers obtained in Examples 44 and 45 are presumed to be substantially free from a branched structure.

COMPARATIVE EXAMPLE 20

A sealable pressure-resistant glass ampoule having an inner volume of 150 ml was charged with 49 g of toluene and 1.0 g of butadiene in a nitrogen atmosphere, and the content was maintained at a constant temperature of 50° C. Then a solution of 0.0014 mmol of tin tetrachloride in toluene was added to carry out polymerization at 50° C. for 60 minutes. To this polymerization solution, a minor amount of methanol was added to be quenched, and the polymerization solution was poured into a salient amount of methanol containing an antioxidant to precipitate a polymer. The polymer was dried and weighted to determine the yield of polymer. The yield and results of the analysis of polymer are shown in Table 15.

EXAMPLE 46

A solution of 0.033 mmol of TiES in toluene was dropwise added to a solution of 33.3 mmol of methylaluminoxane, and the mixture was maintained at 25° C. for 5 minutes to effect aging.

A sealable pressure-resistant glass ampoule having an inner volume of 150 ml was charged with 49 g of toluene and 1.0 g of butadiene in a nitrogen atmosphere, and the content was cooled to −25° C. The above-mentioned aged catalyst was added into the ampoule to carry out polymerization at −25° C. for 5 minutes. A minor amount of the polymerization solution was sampled for GPC measurement. Then a solution of 0.013 mmol of tin tetrachloride in toluene was added to carry out polymerization for 60 minutes while the temperature was allowed to naturally rise to room temperature. To this polymerization solution, a minor amount of methanol was added to be quenched, and the polymerization solution was poured into a salient amount of an aqueous acidic methanol containing an antioxidant to precipitate a polymer. The polymer was dissolved in toluene and then the polymer solution was subjected to centrifugal separation to remove the ash content. The polymer was then re-precipitated from an aqeos methanol, and dried and weighted to determine the yield of polymer. The results are shown in Table 15. As seen from Table 15, the thus-obtained butadiene polymer composition had a high cis-bond content, uncoupled polymer (I) in the polymer composition had a narrow molecular weight distribution, and the degree of coupling was 36%. This polymer composition was obtained with an improved efficiency.

EXAMPLE 47

By the same procedures as employed in Example 46, polymerization of butadiene and analysis of polymer were carried out except that amount of methylaluminoxane was changed to 50 mmol, amount of TiES was changed to 0.05 mmol, and 0.04 mmol of ethyl acetate was used instead of tin tetrachloride as a coupling agent. The results are shown in Table 15.

TABLE 15

| Example No. | C20* | 46 | 47 |
| --- | --- | --- | --- |
| Catalyst | n-BuLi* | TiES | TiES |
| Aging [Temp. (° C.) × Time (min)] | — | +25 × 5 | +25 × 5 |
| BD/Ti* (g/mmol) | — | 30 | 20 |
| BD/Li* (g/mmol) | 50 | — | — |
| Polymn. temp. (° C.) | +50 | −25 | −25 |
| Polymn. time (min or h) | 1 h | 5 m | 5 m |
| Coupling agent | SnCl$_4$ | SnCl$_4$ | CH$_3$COOEt |
| Yield (%) | 100 | 100 | 100 |
| Cis content (%) | 35 | 93 | 93 |
| Polymer (I), $10^{-4}$ Mn | 7.0 | 6.7 | 5.3 |
| Polymer (I), Mw/Mn | 1.08 | 1.26 | 1.21 |
| Polymer (II), $10^{-4}$ Mw/Mn | 20.0 | 28.3 | 15.6 |
| Polymer (II), Mw/Mn | 1.12 | 1.28 | 1.03 |
| Coupling degree | 35 | 36 | 17 |

*C20: Comparative Example 20
n-BuLi: n-butyllithium catalyst
BD/Ti: Amount of butadiene (g) per mmol of titanium in catalyst
BD/Li: Amount of butadiene (g) per mmol of lithium in catalyst From the results of GPC-MALLS measurement shown in Example 2 and Comparative Examples 1 and 2 in Table 1, it is confirmed that a butadiene polymer obtained by polymerization using TiES catalyst is substantially free from a branched structure. Thus, polymers (I) in the polymer compositions obtained in Examples 46 and 47 are presumed to be substantially free from a branched structure.

INDUSTRIAL APPLICABILITY

In the process for production of a conjugated diene polymer according to the present invention, a living polymerization reaction proceeds with a high activity. Therefore, the butadiene polymer of the present invention, which is produced by this process, is characterized as having a high living polymer chain content, a high cis-bond content, a high molecular weight, a narrow molecular weight distribution, and an extremely reduced content of branched structure. Due to these characteristics, terminal-modified butadiene polymer made from the butadiene polymer, and a coupled butadiene polymer made therefrom have specific chemical structures, and thus, these butadiene polymers are expected to have enhanced utility as novel rubber materials in various fields.

What is claimed is:

1. A butadiene polymer which is a homopolymer of butadiene or a copolymer of butadiene with a monomer copolymerizable therewith, comprising at least 50% by weight of butadiene units in the butadiene polymer, wherein the content of butadiene units having a cis-bond in the total butadiene units is at least 50%, wherein the number average molecular weight (Mn) of the butadiene polymer is in the range of 1,000 to 10,000,000, wherein the ratio (Mw/Mn) of the weight average molecular weight (Mw) to the number average molecular weight (Mn) of the butadiene polymer is below 1.5, and wherein the butadiene polymer has at least 80%, based on the total molecular chains, of living chains containing a transition metal of group IV of the periodic table at a terminal thereof.

2. A process for producing a conjugated diene polymer, comprising polymerizing a conjugated diene monomer alone, or at least 50% by weight of a conjugated diene monomer with not more than 50% by weight of a monomer copolymerizable therewith at a temperature of not higher than 10° C. in the presence of a catalyst comprising (A) a compound of a transition metal of group IV of the periodic table having a cyclopentadienyl structural unit which may have a substituent, and (B) at least one co-catalyst selected from (a) an organoaluminum-oxy compound, (b) an ionic compound capable of reacting with the transition metal compound (A) to give a cationic transition metal compound, (c) a Lewis acid compound capable of reacting with the transition metal compound (A) to give a cationic transition metal compound, and (d) an organometallic compound having a main element metal of groups I to III of the periodic table, wherein said transition metal compound (A) is or has been contacted with said co-catalyst under conditions satisfying the following formulae (α) and (β):

$$-100 < T < 80 \quad (\alpha)$$

$$0.017 < t < 6000 \times \exp(-0.0921 \times T) \quad (\beta)$$

wherein t is contact time (minutes) and T is contact temperature (°C.).

3. The process for producing a conjugated diene polymer according to claim 2, wherein said compound (A) of a transition metal of group IV of the periodic table having a cyclopentadienyl structural unit has a substituent having at least one kind of an atomic group selected from the group consisting of a carbonyl group, a sulfonyl group, an ether group and a thioether group.

4. The process for producing a conjugated diene polymer according to claim 2, wherein said compound (A) of a transition metal of group IV of the periodic table having a cyclopentadienyl structural unit having a substituent with at least one kind of an atomic group selected from the group consisting of a carbonyl group, a sulfonyl group, an ether group and a thioether group is a transition metal compound of group IV of the periodic table represented by the following formula (4) or formula (5):

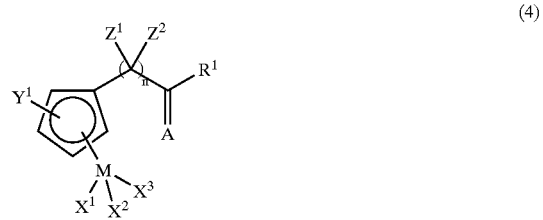

wherein M is a transition metal of group IV of the periodic table, $X^1$, $X^2$ and $X^3$ are hydrogen, a halogen, a C1–12 hydrocarbon group or a C1–12 hydrocarbon-oxy group, $Y^1$ is hydrogen or a C1–20 hydrocarbon group which may form a ring together with the cyclopentadienyl group, $Z^1$ and $Z^2$ are hydrogen or a C1–12 hydrocarbon group, A is oxygen or sulfur, $R^1$ is hydrogen, a C1–12 hydrocarbon group, a C1–12 hydrocarbon-oxy group or a C1–12 hydrocarbon-thio group, and n is an integer of 0 to 5, and the pentagon with a circle therein represents a cyclopentadienyl ring structure,

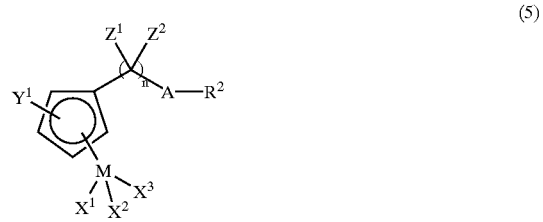

wherein M is a transition metal of group IV of the periodic table, $X^1$, $X^2$ and $X^3$ are hydrogen, a halogen, a C1–12 hydrocarbon group or a C1–12 hydrocarbon-oxy group, $Y^1$ is hydrogen or a C1–20 hydrocarbon group which may form a ring together with the cyclopentadienyl group, $Z^1$ and $Z^2$ are hydrogen or a C1–12 hydrocarbon group, A is oxygen or sulfur, $R^2$ is a C1–12 hydrocarbon group, n is an integer of 0 to 5, and the pentagon with a circle therein represents a cyclopentadienyl ring structure.

5. A terminal-modified butadiene polymer which is a homopolymer of butadiene or a copolymer of butadiene with a monomer copolymerizable therewith, having at least 50% by weight of butadiene units, wherein the content of butadiene units having a cis bond in the total butadiene units of the butadiene polymer is at least 50%; the number average molecular weight (Mn) of the butadiene polymer is in the range of 1,000 to 10,000,000; the ratio (Mw/Mn) of the weight average molecular weight (Mw) to the number average molecular weight (Mn) of the butadiene polymer is smaller than 3.0; a relationship represented by the formula;

$$\log(Mw/Mn) < 0.162 \times \log(Mw) - 0.682$$

is satisfied between the weight average molecular weight (Mw) and the ratio (Mw/Mn); and the butadiene polymer has at least 10%, based on the total polymer chains, of polymer chains having a functional group at a terminal thereof.

6. A process for producing a terminal-modified conjugated diene polymer, comprising the steps of:

polymerizing a conjugated diene monomer alone, or at least 50% by weight of a conjugated diene monomer with not more than 50% of a monomer copolymerizable therewith in the presence of a catalyst comprising (A) a compound of a transition metal of group IV of the periodic table having a cyclopentadienyl structural unit, and (B) at least one co-catalyst selected from (a) an organoalumimun-oxy compound, (b) an ionic compound capable of reacting with the transition metal compound (A) to give a cationic transition metal compound, (c) a Lewis acid compound capable of reacting with the transition metal compound (A) to give a cationic transition metal compound, and (d) an organometallic compound having a main element metal of groups I to III of the periodic table, wherein said transition metal compound (A) is or has been contacted with said co-catalyst under conditions satisfying the following formulae ($\alpha$) and ($\beta$):

$$-100 < T < 80 \quad (\alpha)$$

$$0.017 < t < 6000 \times \exp(-0.0921 \times T) \quad (\beta)$$

wherein t is contact time (minutes) and T is contact temperature (°C.); and then, contacting the thus-produced conjugated diene polymer with a reagent capable of reacting with a living polymer having a transition metal of group IV of the periodic table at a terminal thereof.

7. A coupled butadiene polymer composition comprising:

(I) 0 to 90 parts by weight of a polymer which is a homopolymer of butadiene or a copolymer of butadiene with a monomer copolymerizable therewith, and which has at least 50% by weight of butadiene units, and in which the content of butadiene units having a cis bond in the total butadiene units is at least 50%, the number average molecular weight (Mn) is in the range of 1,000 to 10,000,000, and a relationship represented by the formula:

$$\log(Mw/Mn) < 0.162 \times \log(Mw) - 0.682$$

is satisfied between the weight average molecular weight (Mw) and the ratio (Mw/Mn); and (II) 100 to 10 parts by weight of a polymer composed of at least two molecules of the above-mentioned polymer (I), bonded through a coupling agent.

8. A process for producing a coupled conjugated diene polymer, comprising the steps of:

polymerizing a conjugated diene monomer alone, or at least 50% by weight of a conjugated diene monomer with not more than 50% by weight of a monomer copolymerizable therewith in the presence of a catalyst comprising (A) a compound of a transition metal of group IV of the periodic table having a cyclopentadienyl structural unit, and (B) at least one co-catalyst selected from (a) an organoalumimun-oxycompound, (b) an ionic compound capable of reacting with the transition metal compound (A) to give a cationic transition metal compound, (c) a Lewis acid compound capable of reacting with the transition metal compound (A) to give a cationic transition metal compound, and (d) an organometallic compound having a main element metal of groups I to III of the periodic table, wherein said transition metal compound (A) is or has been contacted with said co-catalyst under conditions satisfying the following formulae ($\alpha$) and ($\beta$):

$$-100 < T < 80 \quad (\alpha)$$

$$0.017 < t < 6000 \times \exp(-0.0921 \times T) \quad (\beta)$$

wherein t is contact time (minutes) and T is contact temperature (°C.); and then, contacting the thus-produced conjugated diene polymer with a coupling agent capable of reacting with a living polymer having a transition metal of group IV of the periodic table at a terminal thereof.

* * * * *